United States Patent [19]
Katai et al.

[11] Patent Number: 5,666,542
[45] Date of Patent: Sep. 9, 1997

[54] MULTIMEDIA INFORMATION ADD-ON SYSTEM

[75] Inventors: Yoshiyuki Katai; Toshifumi Kogure; Toshio Watanabe; Mitsuyoshi Yamazaki, all of Kawasaki, Japan

[73] Assignee: Fujitsu Limited, Kawasaki, Japan

[21] Appl. No.: 216,964

[22] Filed: Mar. 24, 1994

[30] Foreign Application Priority Data

Sep. 30, 1993 [JP] Japan ................... 5-245791

[51] Int. Cl.⁶ ................................................. G06T 1/00
[52] U.S. Cl. ..................... 395/762; 395/806; 345/340
[58] Field of Search ........................ 395/144–149, 395/154, 155–157, 161, 600, 762, 806, 807, 761, 779, 782, 340; 345/23, 25, 119, 141; 348/563–565

[56] References Cited

U.S. PATENT DOCUMENTS

| | | | |
|---|---|---|---|
| 4,899,292 | 2/1990 | Montagna et al. | 395/762 |
| 5,142,662 | 8/1992 | Gump et al. | 395/762 |
| 5,208,745 | 5/1993 | Quentin et al. | 364/188 |
| 5,278,946 | 1/1994 | Shimada et al. | 395/62 |
| 5,297,249 | 3/1994 | Bernstein et al. | 395/156 |
| 5,367,619 | 11/1994 | Dipaolo et al. | 395/149 |
| 5,367,621 | 11/1994 | Cohen et al. | 395/762 |
| 5,377,319 | 12/1994 | Kitahara et al. | 395/161 |
| 5,412,774 | 5/1995 | Agarwal et al. | 395/157 |
| 5,432,904 | 7/1995 | Wong | 395/762 |
| 5,539,869 | 7/1996 | Spoto et al. | 395/967 X |

*Primary Examiner*—Joseph H. Feild
*Attorney, Agent, or Firm*—Nikaido, Marmelstein, Murray & Oram LLP

[57] ABSTRACT

Defined information is generated for each of screen information, layout information, and media information in response to an operator's entry when an environment is defined. When a change is monitored in predetermined position information using a screen monitoring unit during the actual operation, a character string to be displayed with media information is extracted according to the contents of the defined information. After media information corresponding to the character string, that is, the name of layout to be used and actual media information is obtained, and the position and size of a frame and the display format of the media are further obtained, each depending on the name of layout to be used, media information corresponding to the character string to be displayed with media information is displayed. Thus, character string information can be displayed with multimedia information added together only by mounting the multimedia information add-on system without restructuring an existing system.

23 Claims, 21 Drawing Sheets

| SETTING SCREEN INFORMATION | |
|---|---|
| SCREEN ID FIELD | 1.1 ~ 1.10 |
| SCREEN ID | RETRIEVAL RESULT |
| CHARACTER STRING FIELD | 5.5 ~ 5.15 |

Fig. 9A

| SETTING LAYOUT INFORMATION | |
|---|---|
| LAYOUT NAME | LAYOUT A |
| DISPLAY POSITION | 100, 100 |
| DISPLAY SIZE | 100, 100 |
| MEDIA | MEDIA X |
| | STATIC IMAGE |
| DISPLAY POSITION | 0, 0 |
| DISPLAY SIZE | 50, 50 |

Fig. 9B

| SETTING MEDIA INFORMATION | |
|---|---|
| CHARACTER STRING | ddd |
| LAYOUT TO BE USED | LAYOUT A |
| | MEDIA X APPEARANCE ddd.TIF |

| KEY → CHARACTER STRING ① | TOOL NAME ② | MEDIA NAME ③ | OTHERS ④ |
|---|---|---|---|
| 910A001 | IMAGE DISPLAYING TOOL A | "GEAR" | COMMENT, HISTORY, ETC. ENTERING ADDITIONAL INFORMATION ON MEDIA |
| 910B010 | IMAGE DISPLAYING TOOL B | "GEAR B" | |
| 910C001 | VOICE OUTPUTTING TOOL | "EXPLANATION OF SCREEN" | |
| a { 910C001 | CHARACTER OUTPUT- TING TOOL | "EXPLANATION OF SCREEN" | |
| 910F001 | PROCEDURE TOOL | PROCEDURE A | |

(columns 2-4 grouped under MEDIA INFORMATION)

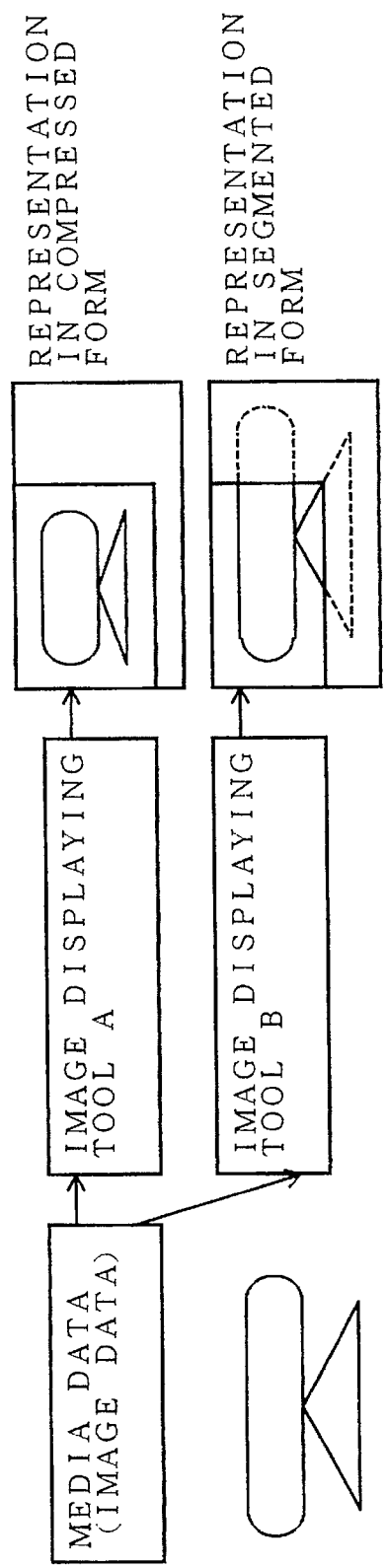

Fig. 17

(PARTS ORDER SYSTEM)
APPLICATION MODEL : PARTS ORDER ACCEPTING SYSTEM
USER : ORDER ACCEPTING/PLACING PERSON
LOCATION : FACTORY RECEPTION / DELIVERY CENTER

Fig. 15A

| FACTORY NO.<br>= 1817<br>NAME = NUMAZU | | PERSON-IN-CHARGE NO.<br>= 810091<br>NAME = FUJI | |
|---|---|---|---|
| PARTS NO. | UNIT PRICE | QUANTITY | SUB-TOTAL |
| 910A001 | 200 | 10 | 2000 |
| 910B010 | 50 | 30 | 1500 |

HOST SCREEN

Fig. 15B

SPECIFYING A CHARACTER STRING

| FACTORY NO.<br>= 1817<br>NAME = NUMAZU | | PERSON-IN-CHARGE NO.<br>= 810091<br>NAME = FUJI | |
|---|---|---|---|
| PARTS NO. | UNIT PRICE | QUANTITY | SUB-TOTAL |
| 910A001 | 200 | 10 | 2000 |
| 910B010 | 50 | 30 | 1500 |

METHOD (1) OF DISPLAYING CHARACTER STRING WITH MULTIMEDIA

Fig. 16A

METHOD (2) OF DISPLAYING CHARACTER STRING
WITH MULTIMEDIA

Fig. 16B

METHOD (3) OF DISPLAYING CHARACTER STRING
WITH MULTIMEDIA

SPECIFYING A CHARACTER STRING

DISPLAYING MULTIMEDIA
(DYNAMICALLY DISPLAYING IMAGES)

| FACTORY NO.<br>= 1817<br>NAME = NUMAZU | | PERSON-IN-CHARGE NO.<br>= 810091<br>NAME = FUJI | |
|---|---|---|---|
| PARTS NO. | UNIT PRICE | QUANTITY | SUB-TOTAL |
| 910A001 | 200 | 10 | 2000 |
| 910B010 | 50 | 30 | 1500 |

"THIS IS A HANDLE GEAR FOR A SEDAN "A" OF '91 MODEL."

OUTPUTTING MULTIMEDIA
(DYNAMICALLY OUTPUTTING VOICE SOURCE)

Fig. 21A

METHOD OF SPECIFYING CHARACTER STRING WITH MULTIMEDIA

Fig. 21B

WINDOW 1
WINDOW 2

DISPLAYING MULTIMEDIA
(DYNAMICALLY DISPLAYING IMAGES)

MULTIMEDIA INFORMATION ADD-ON SYSTEM

BACKGROUND OF THE INVENTION

1. Field of the Invention

The present invention relates to a multimedia information add-on system capable of adding multimedia information such as static images, animation, voice, etc. to alphabetic and numeric information system when the information is displayed on a display unit.

The present invention generates defined information for each of screen information, layout information, and media information in response to an operator's entry when an environment is defined, monitors using a screen monitoring unit a change in predetermined position information during the actual operation, extracts a character string to be displayed with media information according to the contents of the defined information if a change in the information has been detected, obtains media information corresponding to the character string, that is, the name of layout to be used and actual media information to be displayed within a display frame, obtains the position and size of a frame and the display format of the media, each depending on the name of layout to be used, and displays media information corresponding to the character string to be displayed with the media information. Thus, character string information can be displayed with multimedia information added together only by mounting or installing the multimedia information add-on system without restructuring an existing system.

2. Description of the Related Art

Normally, alphabetic and numeric information (hereinafter referred to as a "character string") is used as common display information among the information displayed on the screen of a computer system. However, it has become possible to display a character string with multimedia information such as a static image, animation, voice, text, etc. with the increasing use of high-performance hardware at a lower cost. Accordingly, character strings have been displayed with the multimedia information in various fields of applications.

Conventionally, only a small precentage of personal computers and terminal units can process multimedia information. Actually, very few office computer systems having a host computer have the function of processing the multimedia information.

Actually, most office computer systems, etc. have not been provided with multimedia information add-on systems because they are designed to process character strings as their primary function. Therefore, a system can be modified to include a multimedia system only by greatly reorganizing a main system and the configuration of the entire system including a communications unit, etc. Furthermore, if conventional systems designed mainly to process alphabetic and numeric information are reconfigured to be multimedia information displaying systems, then a program for displaying each type of media information is required, and an operator's instruction is required to display each type of media information, thereby causing operational problems. Furthermore, if a plurality of types of media information are to be displayed, operational deterioration occurs due to the increase in number of operator's instructions. Additionally, no restrictions placed on display positions cause the problem that a display screen often becomes undesirably complicated.

SUMMARY OF THE INVENTION

The present invention has been developed based on the above described background, and enables multimedia information to be displayed without reconfiguring an existing system of displaying character strings. It aims at providing a multimedia information add-on system capable of detecting a predetermined character string displayed on an existing character string information display system, and automatically displaying media information and, furthermore, displaying plural types of media information simultaneously and in an optimally formatted layout without affecting operator's efficiency.

To attain the above described objects, the present invention generates defined information in response to operator's entries made at the definition of an environment, such as information for use in a determination of a change in the contents of data displayed on the display screen in an existing character displaying system, extraction position information for character strings to be displayed with media information, layout information specifying the position, size, etc. of a frame, actual media information to be displayed, etc.

The existing character displaying system carries out its task for displaying characters, and practically displays predetermined character strings on its display screen. Another task other than that executed by the existing system for displaying characters monitors a predetermined position on the display screen, reads the above described layout information and actual media information to be displayed in accordance with the character strings displayed on the predetermined position, and displays them on the display screen.

Thus, the present invention generates various types of defined information in response to an operator's entry made at the definition of an environment, and displays media information for the character strings to be displayed on the display screen of an existing character displaying system in a predetermined layout.

Thus, the present invention provides an existing character displaying system with the function of displaying multimedia information without reconfiguring the existing character displaying system or rewriting the existing program of the character displaying system.

BRIEF DESCRIPTION OF THE DRAWINGS

FIGS. 9A, 9B and 9C show examples of a display screen generated at the definition of an environment according to the first embodiment;

FIG. 13 shows the contents of the management information table according to the second embodiment;

FIGS. 15A and 15B show practical examples (1) of the second embodiment;

FIGS. 16A and 16B show practical examples (2) of the second embodiment;

FIG. 17 shows a multimedia system according to the second embodiment;

FIGS. 21A and 21B show examples of a displaying of multimedia information (m to n) according to the second embodiment.

DESCRIPTION OF THE PREFERRED EMBODIMENTS

The present invention has been developed as a multimedia information add-on system capable of displaying multimedia information together with character strings by adding the add-on system to an existing character displaying system without redesigning the existing character displaying system for displaying character string information.

The first embodiment is explained below with reference to the attached drawings.

First, the fundamental principle of the present invention is explained before describing the first embodiment.

Figure 1:
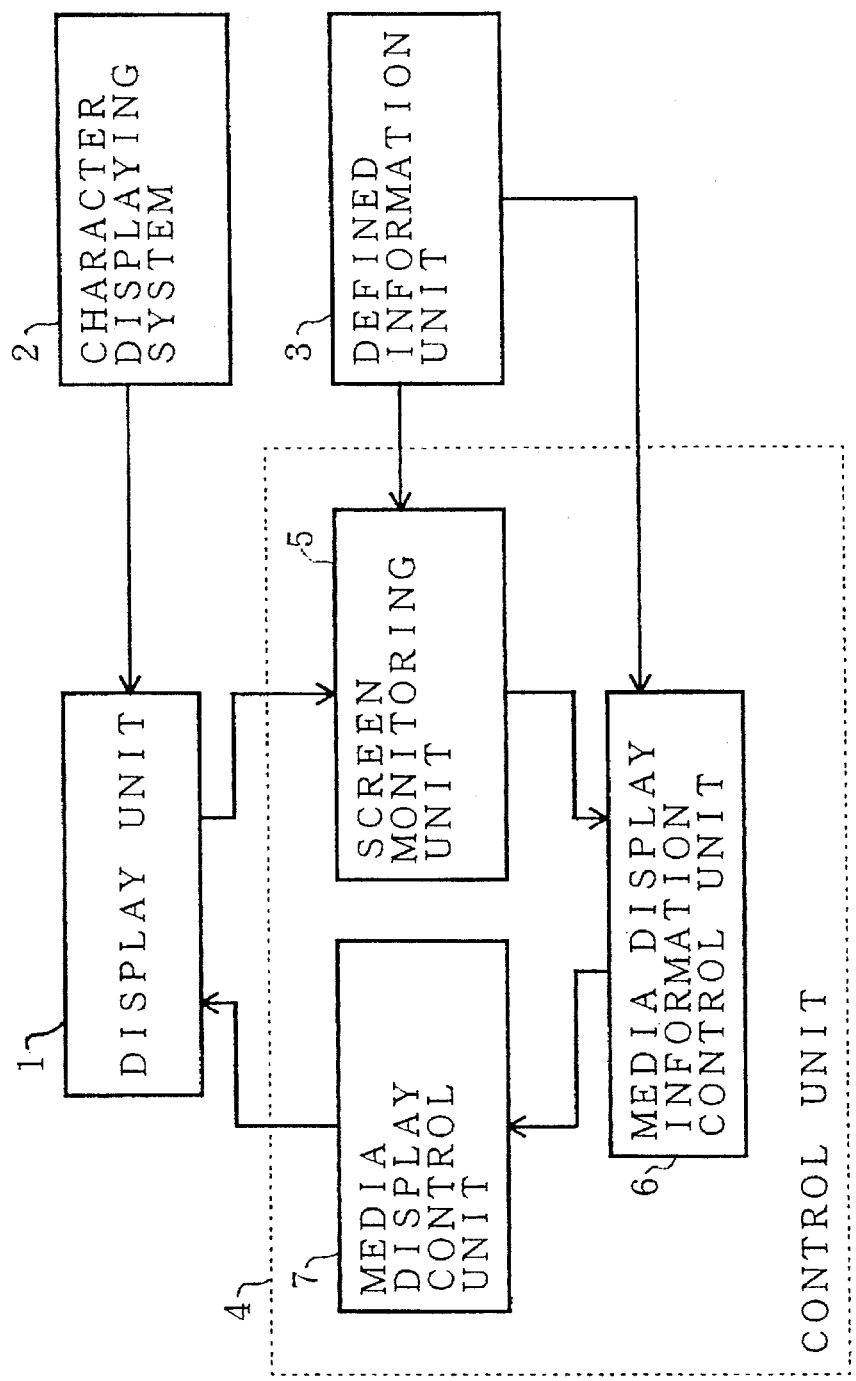
FIG. 1 is the block diagram showing the principle of the first embodiment of the present invention.

FIG. 1 is the block diagram showing the principle of the present invention (the first embodiment).

The defined information unit 3 stores defined screen information for use in determining whether or not predetermined character strings are being displayed at a predetermined position on the screen of the display device 1, and stores defined media information relating to media information added to the character strings. For example, the defined media information relating to the media information stored in the defined information unit 3 contains layout information for use in actually displaying the information and actual media information to be displayed.

The control unit 4 comprises a screen monitoring unit 5 for detecting that a predetermined character string is being displayed at a position on the screen specified with the defined information, a media display information control unit 6 for reading information on the defined screen information from the defined information unit 3 based on the detection result of the screen monitoring unit 5, and a media display control unit 7 for outputting to the display device 1 the information read by the media display information control unit 6.

Next, the operation of the multimedia information add-on system is described below.

An existing task is carried out first by selectively outputting a character string from the character displaying system 2 to display it on the display device 1, while another task is carried out such that the screen monitoring unit 5 in the control unit 4 determines whether or not a predetermined character string exists at a position specified by the defined screen information on the screen of the display device 1. Then, the media display information control unit 6 reads media information relating to the defined screen information from the defined information unit 3, and the media display control unit 7 displays the media information on the screen of the display device 1.

Thus, the multimedia information displayed by the multimedia information add-on system according to the present invention is automatically added to the character string displayed by the character displaying system, and displayed on the screen of the display device 1. Furthermore, since the present invention displays multimedia information without modifying an existing character displaying system, the existing character displaying system can be easily used as a multimedia information displaying device.

Figure 2:
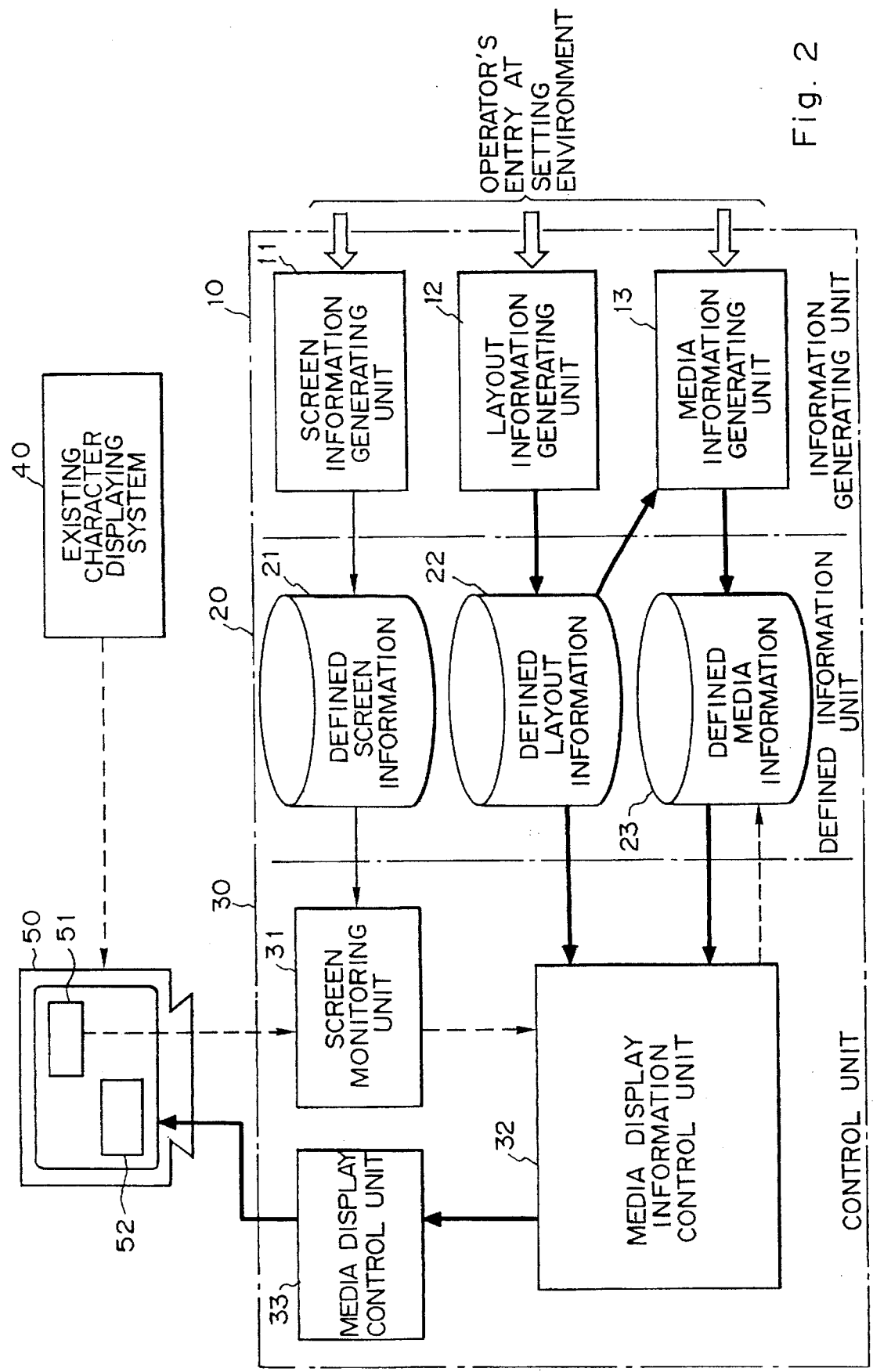
FIG. 2 shows the configuration of the system according to the first embodiment of the present invention.
Figure 3:
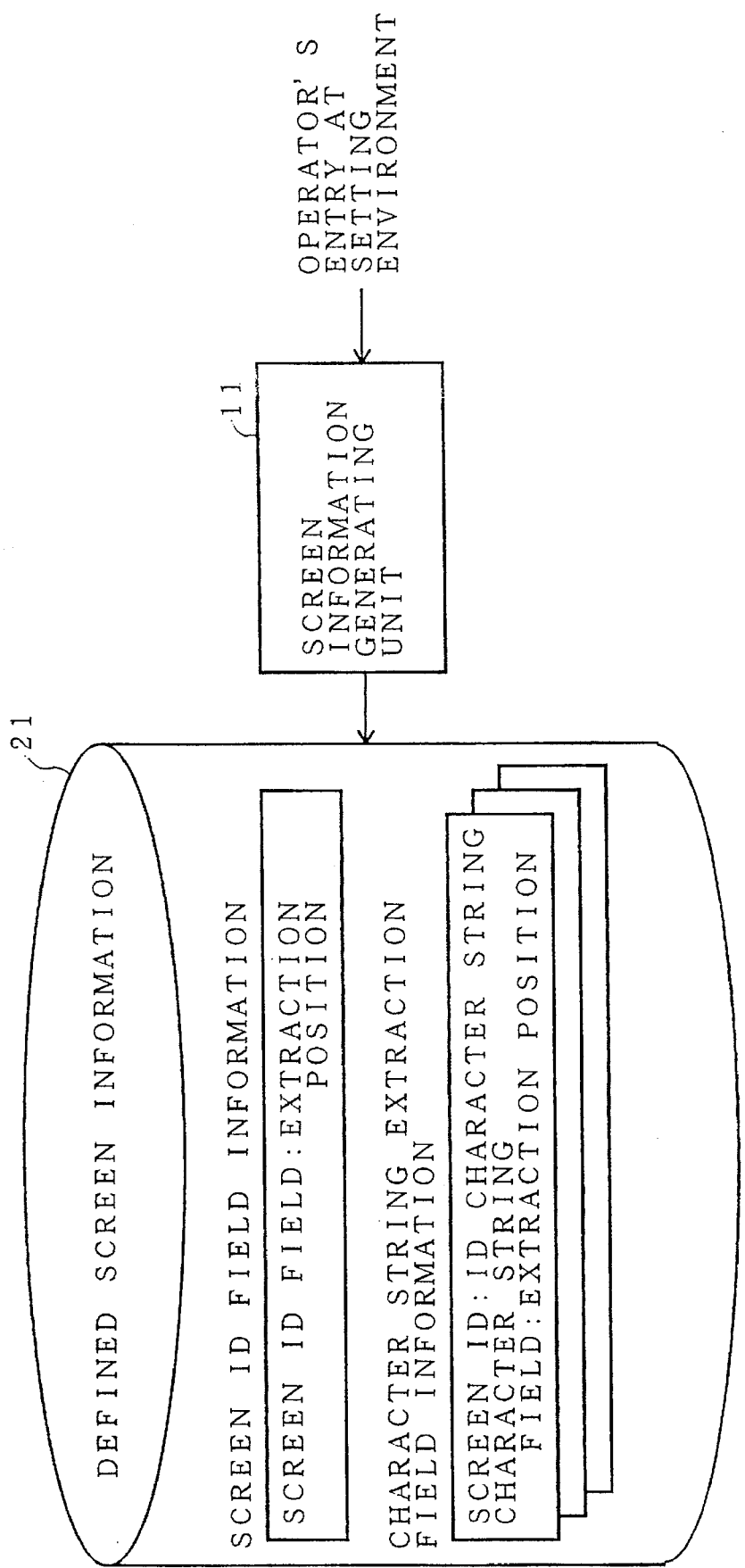
FIG. 3 shows the process performed by the screen information generating unit according to the first embodiment.

FIG. 2 shows the practical configuration of the entire system according to the first embodiment. The system according to the first embodiment mainly comprises an information generating unit 10, a defined information unit 20 generated in the information generating unit 10, and a control unit 30 for controlling a displaying of media information using the defined information in the defined information unit 20. It further comprises an existing character displaying system 40, a display device 50, etc.

The information generating unit 10 comprises three components, that is, a screen information generating unit 11, a layout information generating unit 12, and a media information generating unit 13 to appropriately determine an environment (preprocess) for displaying multimedia information. The three components generate various defined information based on the information specified by an operator (environment designer) at the setting of the environment. Processes performed by each of the components are described below.

The screen information generating unit 11 interactively defines and generates a position at which a character string is extracted for each screen in the existing character displaying system 40. The screen information generating unit 11 generates screen ID (identifier) field information and character string extraction field information based on operator-inputted information entered at the setting of an environment.

The screen ID field information indicates a field position at which a display is regenerated, and the character string contained in the field is processed as a screen ID. The character string extraction field information indicates a position at which a character string to be displayed with multimedia information is extracted. Since the information (character string extraction field information) is generated and managed for each screen ID, definition is performed for the necessary number of screens.

Figure 4:
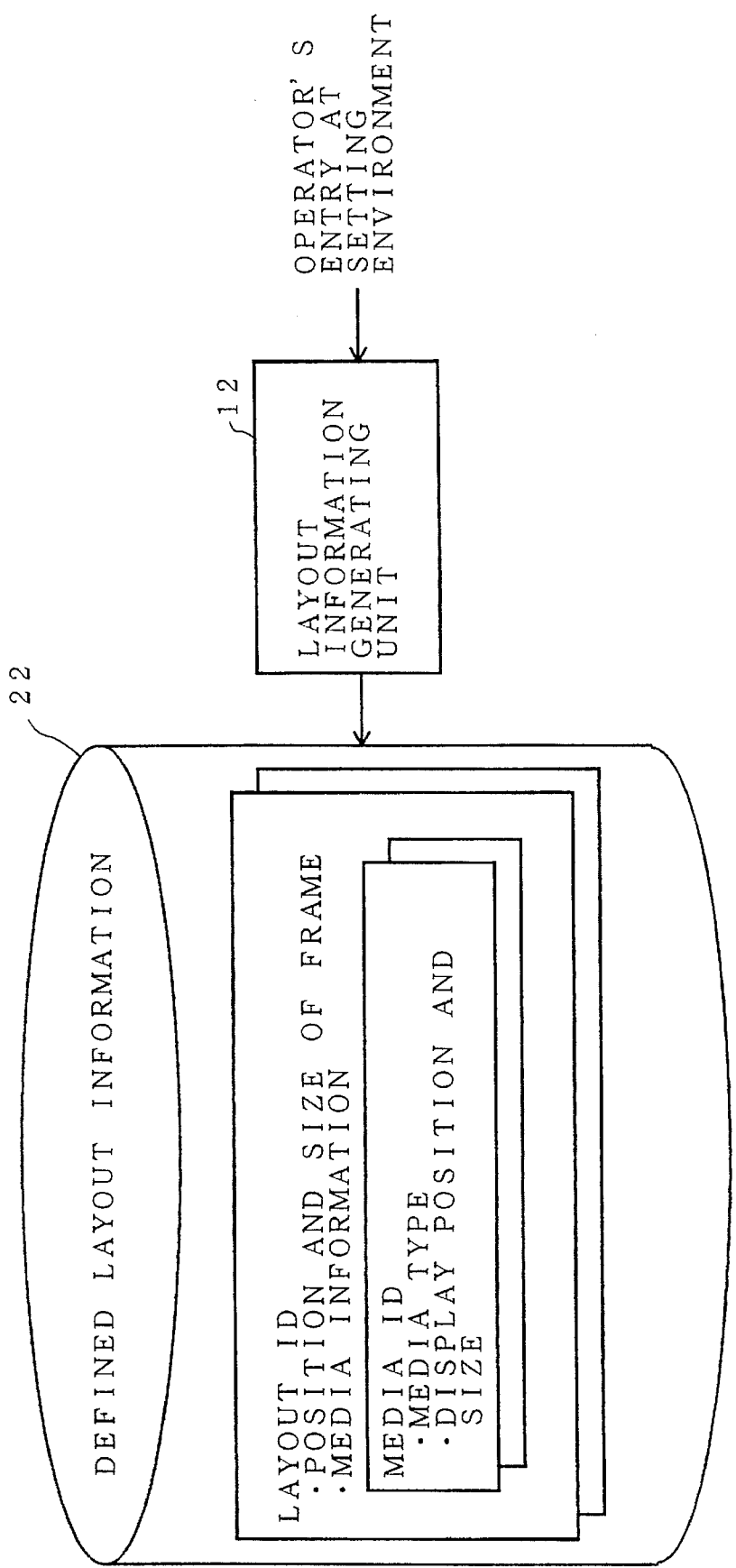
FIG. 4 shows the process performed by the layout information generating unit according to the first embodiment of the present invention.

Next, the layout information generating unit 12 interactively defines and generates a format of a media display including the type and display format, etc. of media to be displayed. The layout information generating unit 12 defines a layout ID for each layout as shown in FIG. 4.

For each layout specified with a layout ID, the position and size of a frame (in which media information is displayed) in an existing character displaying window, and information on a media display format for the layout specified with the layout ID are generated in response to the operator-inputted information at the setting of an environment.

The information on the media display format describes the type, size, etc. of media. Each piece of information is managed with an assigned media ID. The media can be a static image, animation (digital animation and analog animation), voice, text, etc.

The layout information generating unit 12 generates a display format of media information, that is, a format in which media information is generated, and actual media information is generated by the media information generating unit 13.

As described above, the frame is provided to display media information in, and each piece of media information is displayed in the frame. The position and size of a display frame can be optionally determined relative to the position of an existing character displaying window.

Figure 5:
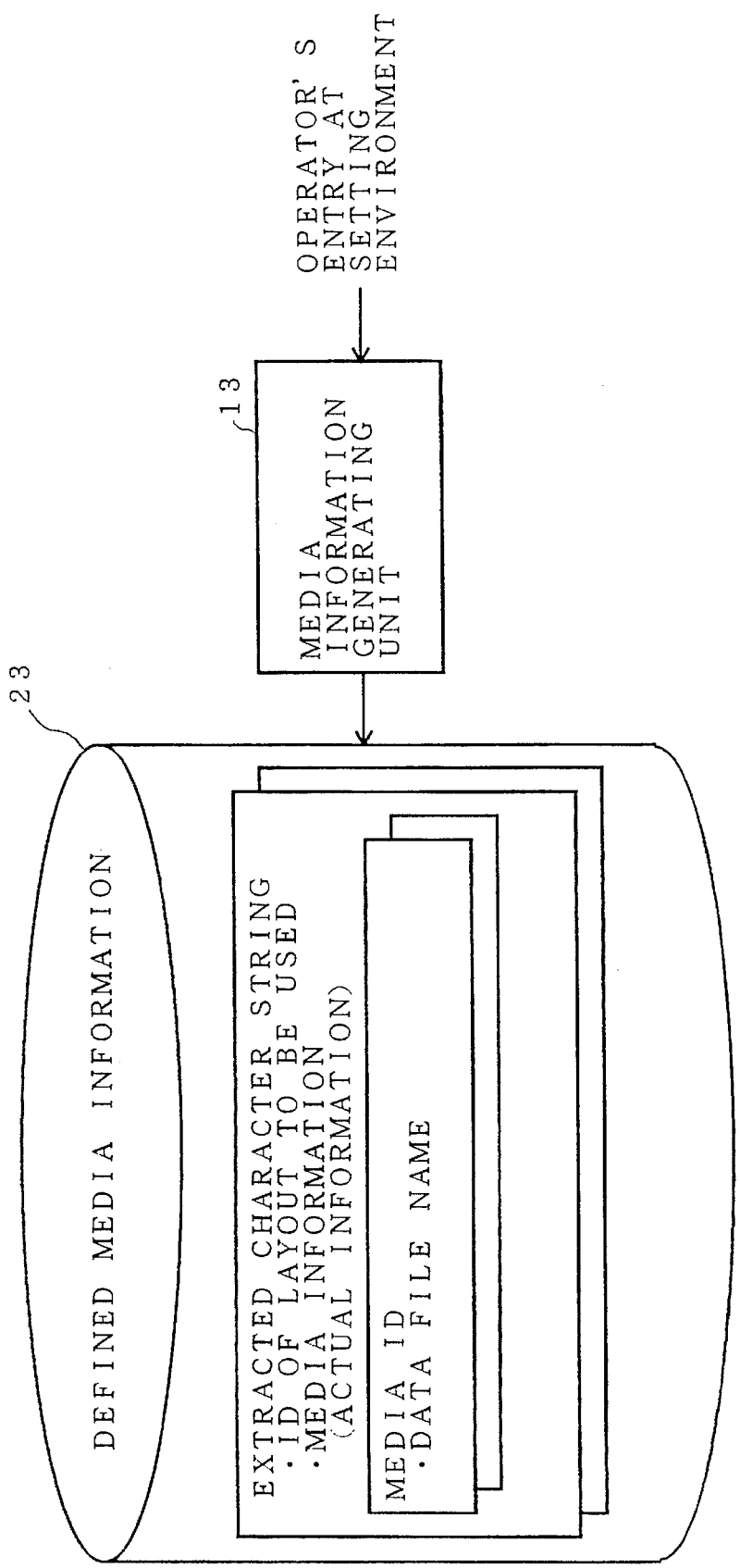
FIG. 5 shows the process performed by the media information generating unit according to the first embodiment.

The media information generating unit 13 interactively defines and generates applicable layout information indicating which layout among variations on layout generated by the layout information generating unit 12 for each character string to be displayed with media information, and actual media information to be displayed in the determined layout to be used as shown in FIG. 5.

The actual media information is displayed in the above described frame, and the data file name indicating the type of media displayed in the selected layout is defined as being assigned to a media ID defined in the frame to be displayed.

Thus, the information generating unit 10 and each piece of defined information are described by reference to FIG. 2. Next, the control unit 30 is explained.

The control unit 30 comprises three components; a screen monitoring unit 31, a media display information control unit 32, and a media display control unit 33, and extracts a character string in the existing character displaying system 40 to display multimedia information based on each piece of defined information generated by the information generating unit 10.

The above described screen monitoring unit 31 keeps checking the screen field information and the character string extraction field information on the display screen at predetermined intervals based on the defined screen information defined by the screen information generating unit 11 so as to monitor a regeneration of a display and a change in a character string to be displayed with media information. If no changes are detected in the value of the screen field information or the character string extraction field information, then it continues monitoring the information. If a change has been detected in the value of the screen field information and the character string extraction field information when the display is regenerated by the operator, etc., then a character string to be displayed with media information is extracted, and control is passed to the media display information control unit 32.

The media display information control unit 32 retrieves information required to display media from a character string to be displayed with media information received from the screen monitoring unit 31. First, it retrieves media information corresponding to the character string to be displayed with media information from defined media information 23, retrieves from defined layout information 22 applicable layout information defined in the retrieved media information, and passes the defined information to the media display control unit 33.

The media display control unit 33 analyzes the information received from the media display information control unit 32 to display media information on the display device 50. It also manages the present state of the screen. If media information is displayed corresponding to the character string being displayed on the screen, the media display control unit displays media information (new media information) corresponding to a character string to be displayed with new media information after clearing from the screen the media information corresponding to the character string being displayed on the screen.

In FIG. 2, display unit 51 in the display device 50 displays a character string to be displayed with media information, while display unit 52 displays media information corresponding to the character string to be displayed with media information. In FIG. 2, an arrow indicating data flow is written in dotted, bold, and fine lines. That is, a dotted line arrow indicates a flow of character information, a bold solid line arrow indicates a flow of media display information, and a fine solid line arrow indicates a flow of screen control information.

Figure 6:
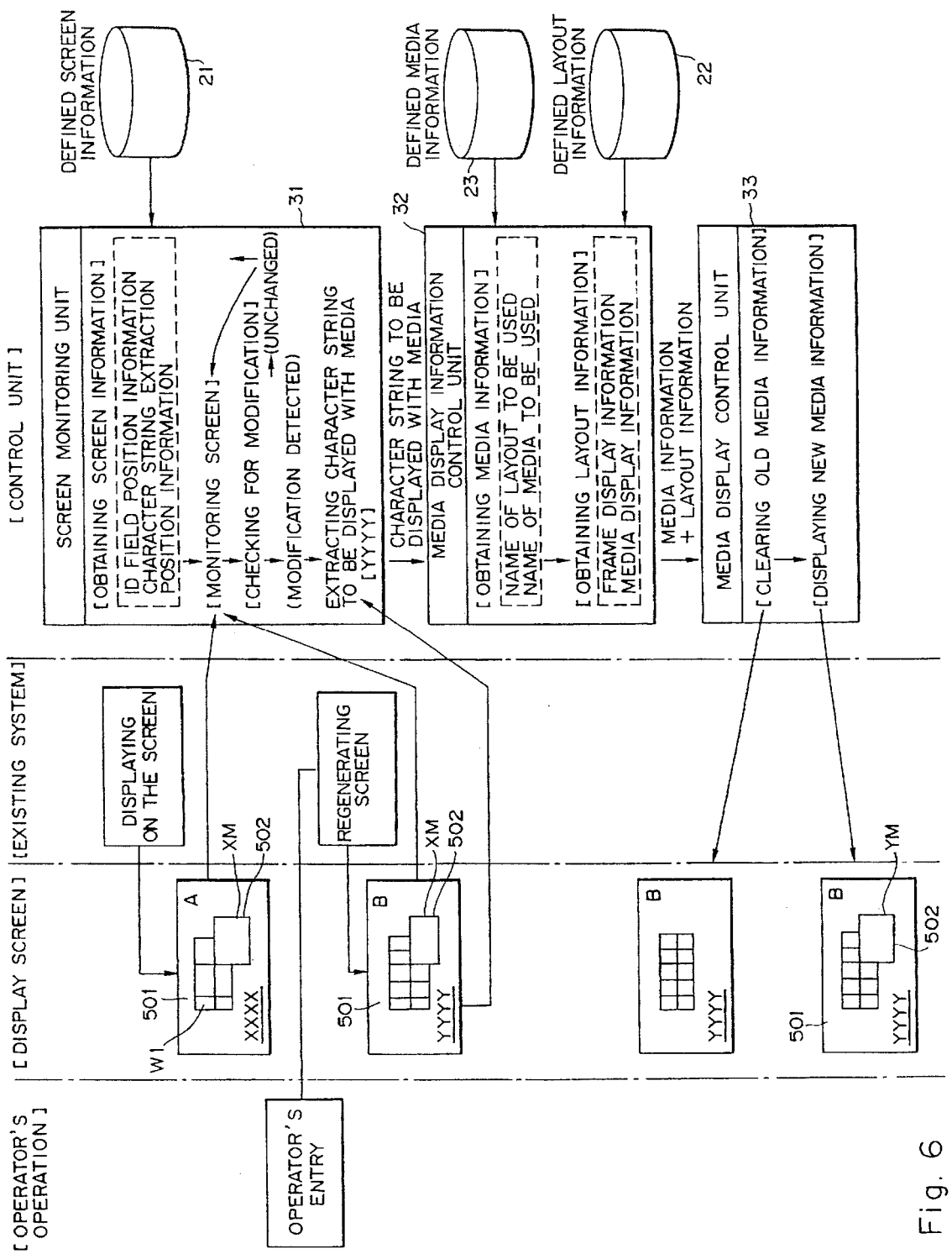
FIG. 6 shows the process performed by the control unit according to the first embodiment.

Thus, according to the first embodiment of the present invention, various kinds of defined information described above, that is, defined screen information, defined layout information, and defined media information, are generated by the information generating unit 10. Based on the defined information generated by the information generating unit 10, the control unit 30 controls the display of multimedia information corresponding to a character string to be displayed with media information on the display device 50. FIG. 6 shows the flow of the process mainly performed by the control unit 30. The process of converting media information after defined screen information, defined layout information, and defined media information have been generated by the information generating unit 10 is described below by referring to FIG. 6.

The screen monitoring unit 31 in the control unit 30 keeps monitoring a predetermined position on the display screen at predetermined intervals. At this time, it is assumed that the display device 50 in the existing character displaying system 40 displays screen A. Screen A displays character string w1, while media information XM corresponding to the character string XXXX to be displayed with media information is displayed.

Then, the screen monitoring unit 31 keeps monitoring at predetermined intervals the screen ID field information for use in determining a refreshing of display of information preliminarily defined by the screen information generating unit 11, and the character string extraction field information for a character string to be displayed with media information.

The position in the screen from which screen ID field information and the character string extraction field information are extracted are predetermined such that a refreshing of a display and a character string extraction field information can be appropriately determined. Practically, the coordinate of each position is predetermined, and a change in the information on the coordinate should be monitored.

If the screen monitoring unit 31 has detected a change in the screen ID field information (change in a screen ID), then it is assumed that the display screen has been regenerated to screen B. At this time, since the regeneration of a display indicates a change in the contents of media information to be displayed. If, after the regeneration of a display, a new character string to be displayed with media information is, for example, YYYY, then the position information of the new character string to be displayed with media information on the screen should be obtained first, and then the character string YYYY to be displayed with media information is extracted and control is passed to the media display information control unit 32. Even if the screen ID field information indicates no change and the display is not regenerated at all, a character string to be displayed with media information can be changed individually. That is, if the contents of data are changed although the screen ID remains the same, then "a change" is determined, a new character string to be displayed with new media information is extracted, and control is passed to the media display information control unit 32.

The media display information control unit 32 retrieves and extracts from the defined information generated by the media information generating unit 13 the media information corresponding to the character string (YYYY in the present case) to be displayed with media information received from the screen monitoring unit 31. That is, when a character string YYYY to be displayed with media information is extracted from the screen monitoring unit 31, the character string YYYY is compared with the contents of a table of character strings to be displayed with media information so as to extract from the table a pointer to an address of the media information corresponding to the character string YYYY.

Practically, an ID of layout to be used corresponding to a character string to be displayed with media information defined as media information is extracted, and media information (actual information) to be displayed according to the layout is extracted from a corresponding data file, etc. Data such as animation, etc. should be extracted taking the frame of a video or a CD into account.

Based on the ID of layout to be used, the position and size of the frame for the layout and the display format of media information are obtained from the defined information generated by the layout information generating unit 12. The media information and layout information thus obtained are passed to the media display control unit 33.

The media display control unit 33 analyzes the media information and the layout information, and displays new media information YM on the display device 50 (media information corresponding to the character string YYYY, in the present case). If another media information is displayed on the display device 50 corresponding to the character string XXXX to be displayed with media information, then the media information being displayed is cleared before new media information is displayed corresponding to the character string YYYY to be displayed with media information.

Thus, according to the first embodiment of the present invention, multimedia information can be displayed without modifying the existing character displaying system, and the multimedia data corresponding to the contents of the displayed characters can be automatically displayed. Furthermore, a plurality pieces of media information can be displayed simultaneously and in an appropriate layout.

According to the first embodiment of the present invention, character string information outputted by the existing character displaying system 40 and outputted on the display device 50 is detected as described below.

The screen monitoring unit 31 constantly monitors the character string received from the character displaying system 40 and displayed on the display device 50, the display position of a character string, that is, a character code, and the present cursor position. When a target code is displayed at a target position, the unit detects that a target character image is displayed.

Since the character string W1 is displayed in the window 501 of the character displaying system 40 for displaying characters to be displayed with media information in a multiwindow system capable of processing multiple windows, a character string is monitored by incessantly checking the window 501 through the control of the window 502 in which the media information XM is displayed based on a window handle (a unique value in a multiwindow system, that is, a value indicating a window in which a database retrieval result is displayed). Another method of monitoring a character string can be performed by, for example, interruptively activating an interval timer from the multimedia information add-on system according to the present invention.

According to the first embodiment of the present invention, a system different from the existing character displaying system 40 is added to the existing character displaying system 40. However, the existing character displaying system 40 can be used to provide its software driver for outputting character codes, etc. in the character displaying system 40 with the function of detecting a character code and its position to generate the capabilities of the above described screen monitoring unit 31. In this case, when a corresponding code is detected, a process of displaying another media information can be driven. Information generating processes can be performed in a batch process when other important processes are not carried out.

Figure 7:
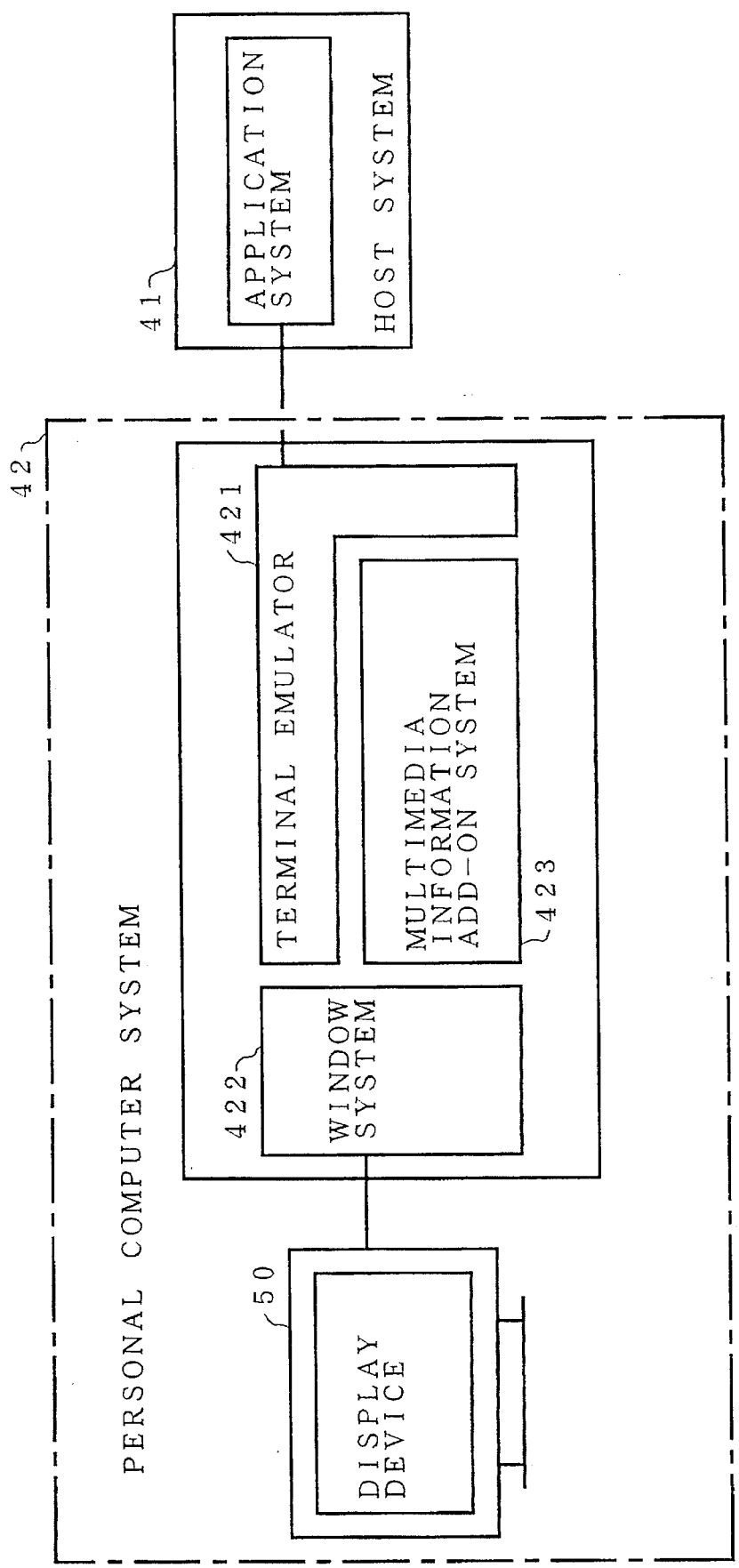
FIG. 7 shows the configuration of the office computer system operated according to the first embodiment.

FIG. 7 shows the configuration of a practical business system to which the first embodiment of the present invention is applied. Practically, it shows an example of applying the present invention to a used car retrieval system.

In FIG. 7, a personal computer system 42 connected to a host system 41 comprises a terminal emulator 421, a window system 422, a display screen 50, and a multimedia information add-on system 423.

With the system, as described above, the information generating unit 10 sets an environment by generating defined screen information, defined layout information, and defined media information through the information generating unit 10 in response to operator-inputted information (where the operator sets an environment).

Figure 8:
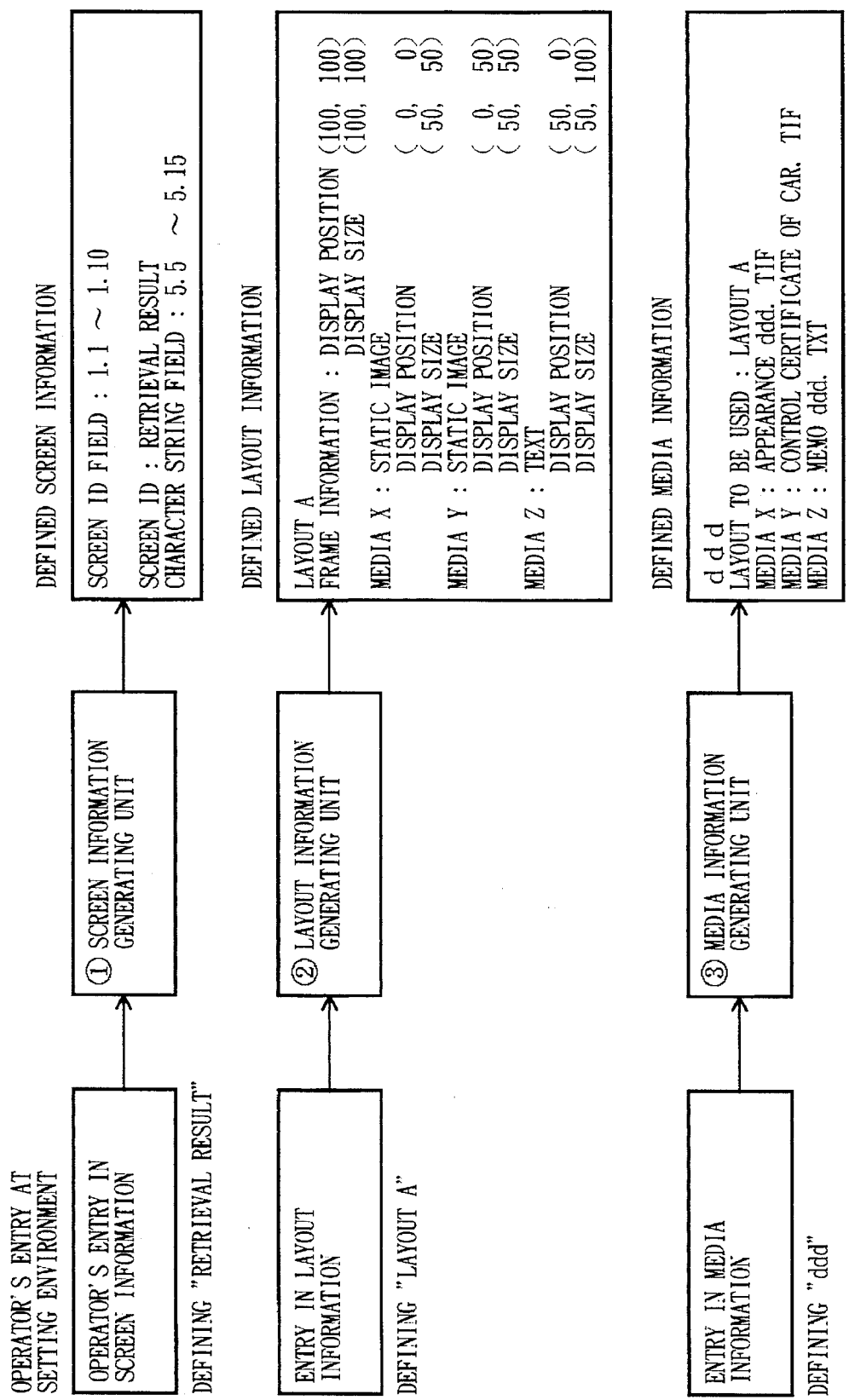
FIG. 8 shows the environment defining process according to the first embodiment.

The operation of setting an environment is described below by referring to FIG. 8.

First, the screen information generating unit 11 generates defined information, that is, the screen ID field information and the character-string-to-be-displayed-with-media-information field information in response to an operator-inputted information at the setting of an environment. For example, it is defined that the screen ID field information is positioned at the coordinates (1, 1) through (1, 10). Then, the character-string-to-be-displayed-with-media-information field information is extracted at the coordinates (5, 5) through (5, 15). For example, it is defined that, if the character string information "retrieval result" is one of the screen IDs, then the extraction position of the character-string-to-be-displayed-with-media-information field information is (5, 5) through (5, 15) when the character string information at (1, 1) through (1, 10) is "retrieval result".

Next, the layout information generating unit 12 generates defined information such as information on the display layout, media display format, etc. in response to the operator's entry when he or she sets an environment. For example, "layout A" is defined as a layout ID. As for frame information, the display of a frame is defined to be positioned at (100, 100) as a relative position in the application screen, and the display size of a frame is defined to be (100, 100) in vertical length by horizontal length, etc. For example, media X, media Y, and media Z are defined as media IDs. Media X is a static image positioned at (0, 0) for display, and its size is defined to be (50, 50). Media Y is a static image positioned at (0, 50) for display, and its size is defined to be (50, 50). Media Z is a text positioned at (50, 0) for display, and its size is defined to be (50, 100). Each value in the parentheses indicate the coordinates on the screen.

Next, the media information generating unit 13 generates actual defined information on the character string to be displayed with media information, ID of layout to be used, media X, media Y, and media Z in response to the operator's entry when he or she sets an environment. For example, it can be designed that the character string "ddd" to be displayed with media information is the model number of the used car, and "layout A" is an ID of layout to be used. Media X, Y, and Z are represented as the actual information on the appearance of the used car (with the file name "appearance ddd.TIF", for example), on the inspection certificate of the used car (with the file name "inspection certificate ddd.TIF", for example), and on the memoranda on the used car (with the file name "memorandum ddd.TXT", for example) respectively.

The information is actually defined as shown in FIGS. 9A and 9B. FIG. 9A shows an example of the contents of a display screen when screen information is defined. If a display screen is set in the screen information generating unit 11, blank columns are displayed to fill the defined contents in. The column "screen ID field" contains, for example, "1.1–1.10" as an above described coordinate. The column "screen ID" contains "retrieval result". The column "character-string-to-be-displayed-with-media-information field" contains the coordinate "5.5–5.15".

When the "next" button (not shown in the attached drawings) is depressed, another blank columns for a screen ID field and a character-string-to-be-displayed-with-media-information field are displayed, and the contents are entered as described above. That is, the screen ID field is defined only once for a character displaying system, whereas the screen ID field and the character-string-to-be-displayed-with-media-information field can be defined more than once. The character-string-to-be-displayed-with-media-information field can be entered by an operator with a predetermined character string.

FIG. 9B shows an example of the contents of a display screen when layout information is defined. If a display screen is set in the layout information generating unit 12, blank columns are displayed to fill the defined contents in. The column of a media name contains an identifier indicating the type of media such as "media X" together with an actual name of the media (for example, "static image", "text", etc.). The columns of a display position and display size contain respective values to define a media display format. When the display formats are entered for media Y, media Z, etc., the "next" button (not shown in the attached drawings) is depressed as described above. Then, the screen is regenerated to define layout information so that a display format can be entered for media Y, media Z, etc.

FIG. 9C shows an example of the contents of a display screen when actual media information is defined. If a display screen is set to generate actual media information, blank columns are displayed to fill the defined contents in. "ddd" is entered as a model number, and a layout name list containing "layout A", "layout B", "layout C", etc. is displayed in the layout to be specified column. If the list is read, the layout name list is displayed. For example, "layout A" is selected from the list. The column "media X" contains, for example, "appearance ddd.TIF" as the name of the file containing the actual information. If another media information should be defined, the "next" button (not shown in the attached drawings) is depressed to display new contents of the display screen to define actual media information on. Then, actual information such as media Y, media Z, etc. is entered as described above.

Each piece of the defined information is thus generated, and preprocesses, that is, a setting of an environment, are terminated.

After the setting of the environment, actual processes are performed. The processes are described below by referring to FIG. 2 showing the configuration of the system, FIG. 10 showing the process performed by the control unit 30 during an actual operation, and FIGS. 11A, 11B, and 11C showing the display screen in operation according to the embodiment.

Figure 10:
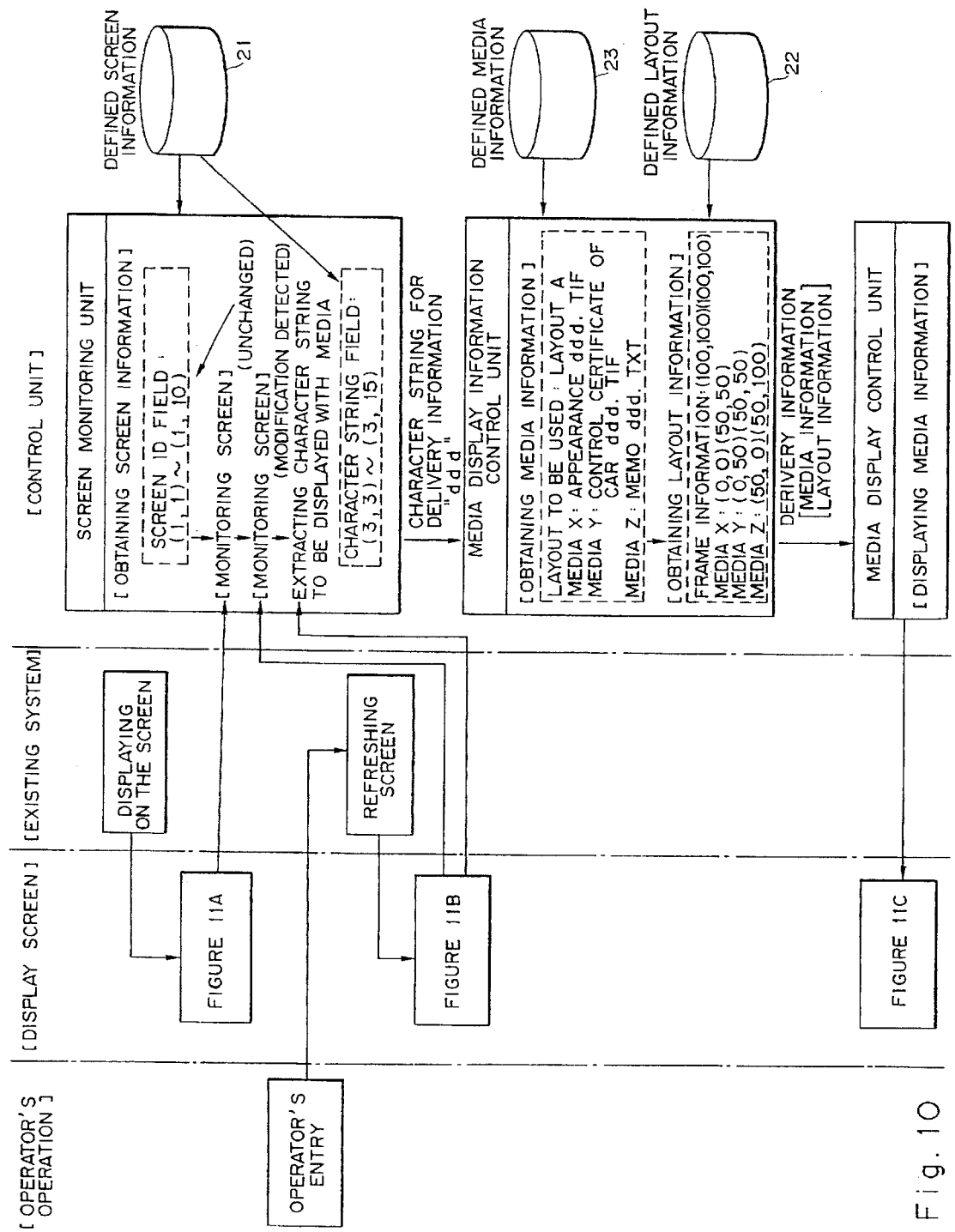
FIG. 10 shows the process performed during the actual operation according to the first embodiment.

The process performed by the control unit 30 as shown in FIG. 10 is fundamentally the same as that described before by referring to FIG. 6.

Figure 11A:
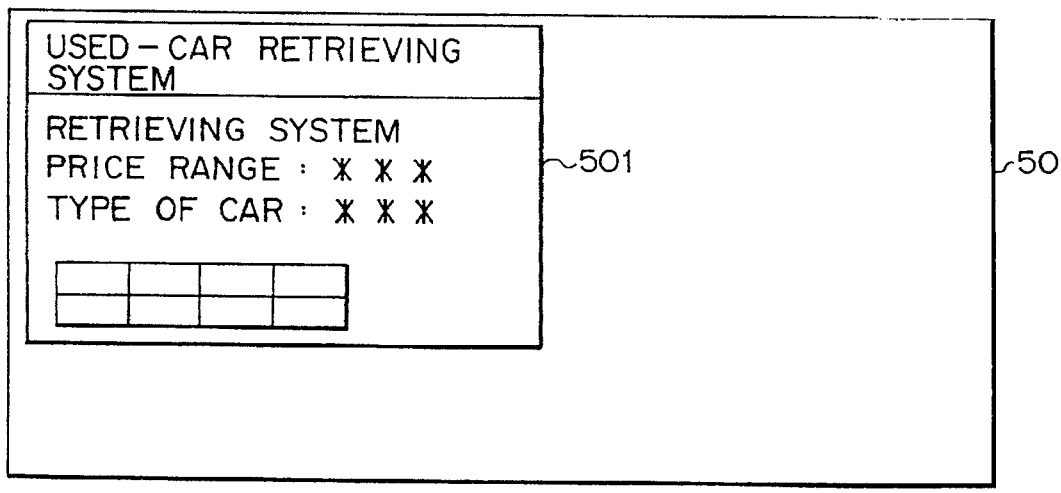
FIGS. 11A, 11B and 11C show change of a display screen during the actual operation according to the first embodiment.

In the multiwindow system, the first window 501 in the display device 50 in the existing character displaying system 40 displays a character string shown in FIG. 11A. Then, the screen monitoring unit 31 refers to the screen information defined by the screen information generating unit 11. In this case, the unit keeps monitoring the character string in the screen ID field positioned at the coordinates (1, 1) through (1, 10).

Figure 11B:
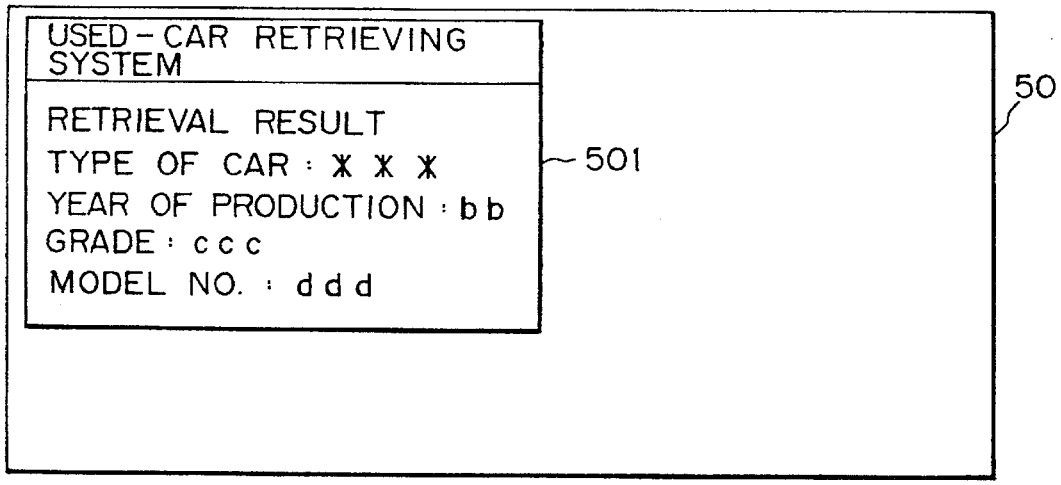
Figure 11C:
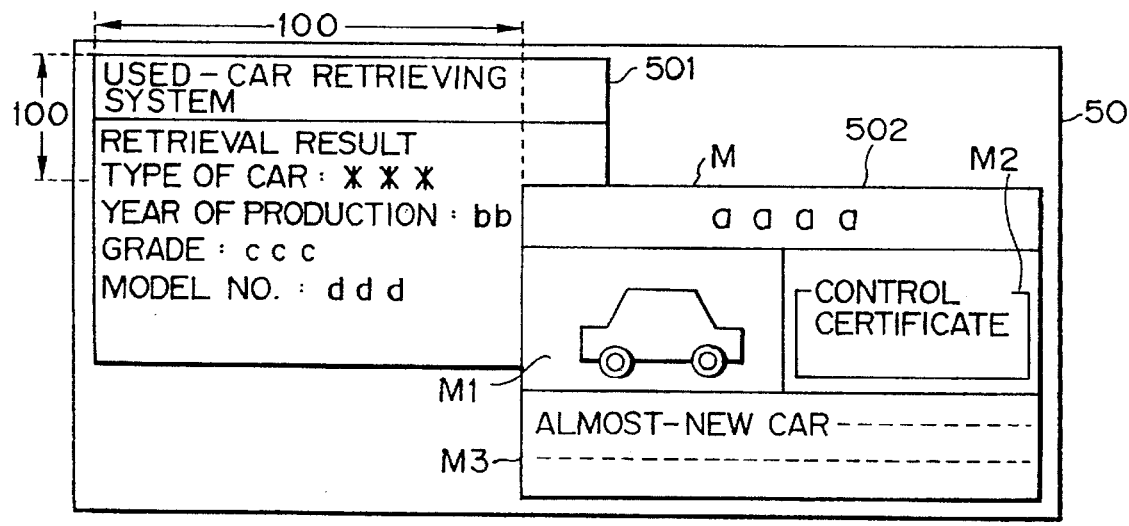

If the contents of the display in the first window 501 shown in FIG. 11A are refreshed as shown in FIG. 11B, then the character string "retrieving system" in the screen ID field positioned at the coordinates (1, 1) through (1, 10) is replaced with "retrieval result". Therefore, the screen monitoring unit 31 detects a change in the screen ID field information (change in screen ID), and determines that the display has been refreshed. In this case, the regeneration of the display indicates a change in a character string to be displayed with media information, and accordingly the contents of a media to be displayed is also refreshed. If the character string to be displayed with media information is "ddd" for the screen ID "retrieval result", then the position information on the new character string to be displayed with media information on the screen is obtained (in the present case, (5, 5) through (5, 15)), and the character string "ddd" to be displayed with media information is extracted from the field, and control is passed to the media display information control unit 32.

The media display information control unit 32 retrieves and extracts media information corresponding to the character string to be displayed with media information ("ddd" in the present case) received from the screen monitoring unit 31 from the defined information generated by the media information generating unit 13.

Practically, "layout A" is retrieved as the name of layout to be used corresponding to the character string to be displayed with media information defined in the media information, and the actual information on media X, Y, and Z is extracted from a data file. At this time, the practical information on media X, Y, and Z is "appearance ddd. TIF", "inspection certificate ddd. TIF", and "memorandum ddd. TXT", respectively.

Based on the ID of layout to be used, the position of the frame (100, 100), the size of the frame (100, 100), and the display format of media X, Y, and Z are extracted from the defined information generated by the layout information generating unit 12. That is, as described above, the layout frame is positioned at (100, 100), the size is defined as (100, 100), the display of "media X" is positioned at (0, 0), the display size is defined as (50, 50), the display of "media Y" is positioned at (0, 50), the display size is defined as (50, 50), the display of "media Z" is positioned at (50, 0), and the display size is defined as (50, 100).

Thus extracted media information and layout information are passed to the media display control unit 33.

The media display control unit 33 analyzes the media information and the layout information, and displays, as shown in FIG. 11C, new media information M (the media information corresponding to the character string "ddd", in the present case, to be displayed with media information) in the second window 502 not in the first window 501. In media information M shown in FIG. 11C, display unit M1 corresponds to media X, and the appearance of the used car is displayed as media information; display unit M2 corresponds to media Y, and the inspection certificate of the used car is displayed as media information; and display unit M3 corresponds to media Z, and the explanation of the contents of the used car is displayed as media information.

Thus, the media information corresponding to the character string "ddd" to be displayed with media information is displayed in the specified layout as shown in FIGS. 11B and 11C.

In the description above, the task of controlling the first window executed by an existing character displaying system in the multiwindow system is different from the task of controlling the second window for monitoring the first window executed by the multimedia information add-on system of the present invention.

In FIGS. 11A, 11B, and 11C, multimedia information can be automatically displayed by monitoring the display of a retrieval result when a character displaying system retrieves data from a data base.

In the first embodiment of the present invention, an area to display media information in is divided corresponding to media X, Y, and Z, but the present invention is not limited to this application. For example, when an area in which media X, Y, and Z are displayed is defined to be used commonly and the character string "ddd" to be displayed with media information is detected, the first media, for example, media X, can be displayed. Furthermore, a key not assigned by the existing character displaying system can be assigned as a key for switching the display of media so that media X, Y, and Z can be displayed sequentially when the key is operated. Thus, plural pieces of information on media X, Y, and Z can be sequentially displayed, and the display device 50 can display data even if the media information to be added to character string information is large in amount. In this case, the media display information control unit 32 contains a buffer for temporarily storing information to be displayed.

As described above, according to the first embodiment of the present invention, defined screen, layout, and media information are generated in response to an operator's entry at the setting of an environment. During the actual operation, the screen monitoring unit monitors information at a predetermined position on the screen. When a change is detected in the information, a character string to be displayed with media information is extracted according to the contents of the above described defined information to obtain media information corresponding to the character string, that is, the name of layout to be used and actual media information.

After obtaining a frame position and size and a media display format determined based on the name of layout to be used, the media information corresponding to a character string to be displayed with media information is displayed. Accordingly, character strings can be easily displayed with multimedia information without altering an existing character displaying system.

According to the first embodiment of the present invention, multimedia information can be automatically displayed and cleared according to a refreshing of a display. That is, when a character string to be displayed with media information is displayed, media information corresponding to the character string is automatically displayed. Therefore, the operator can display character strings together with multimedia information without taking a media displaying operation and clearing operation into account, and without any influence on operability. If the present invention is applied to a listing system for displaying retrieval results, corresponding media data can be displayed on the same page of the list when a change is detected in a character in a list (for example, a person's name).

Furthermore, multimedia information can be easily displayed by the second embodiment without altering a displaying system itself. Since various types of media such as static images, animation, voice, texts are used in reconfiguring media in an optional layout, the media can be displayed in the optimum format depending on each use.

According to the second embodiment, media information is entered corresponding to a character string referred to as a key. Based on the entered media information, media can be extracted and displayed corresponding to a character string displayed on the screen.

The second embodiment is explained below.

Figure 12:
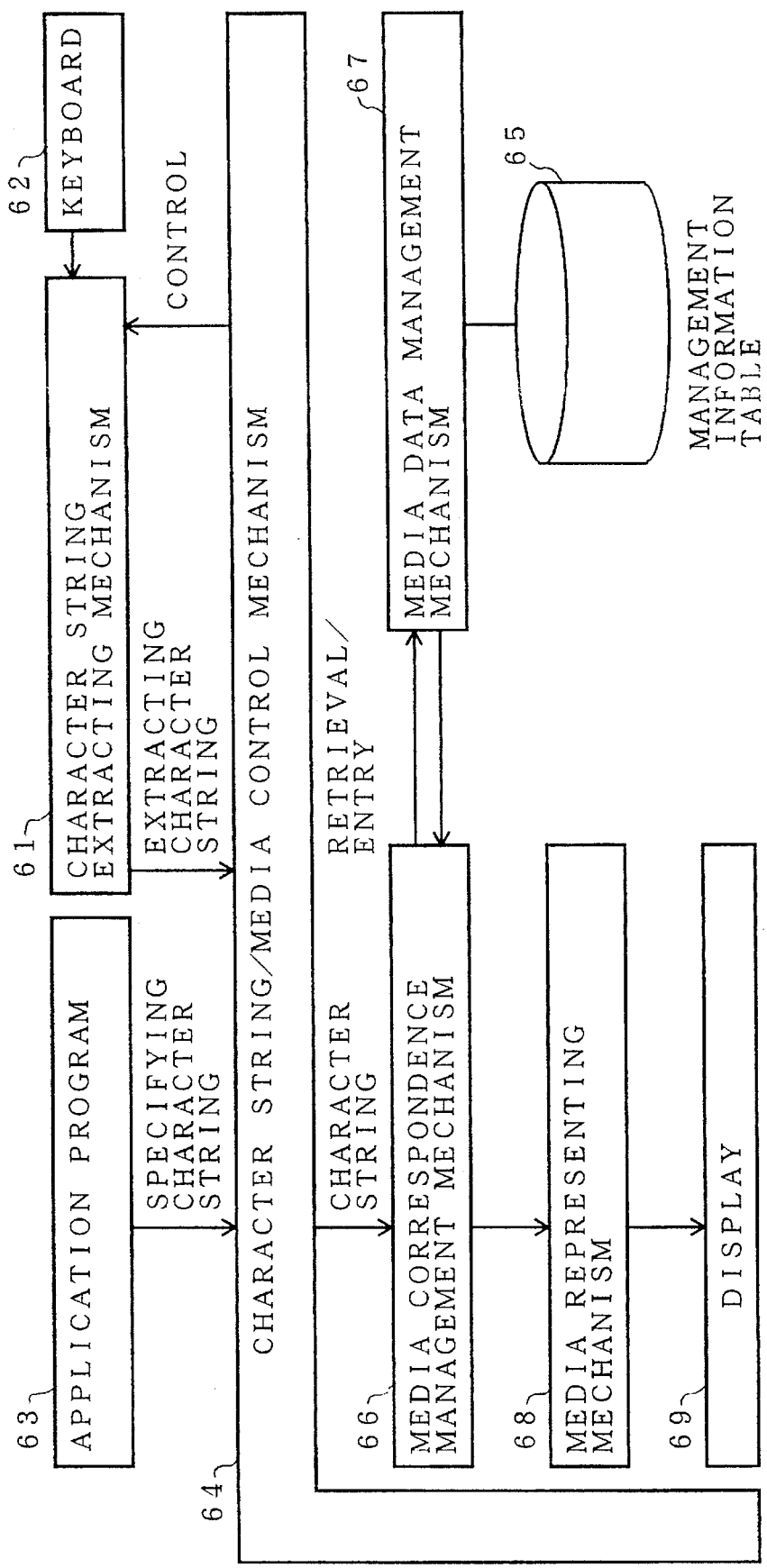
FIG. 12 shows the configuration according to the second embodiment of the present invention.

FIG. 12 shows the configuration according to the second embodiment of the present invention. In FIG. 12, a character string extracting mechanism 61 extracts character string information displayed as a key on the screen of the display device. When an operator selects an optional character string from the character strings displayed on the screen in response to the operator's entry through a keyboard 62, or from the character strings preliminarily entered and displayed on the screen, the extracting mechanism 61 extracts the selected character string. For example, the character string 910A001 in FIG. 15B described later.

An application program 63 outputs character strings and code strings. In the second embodiment, a character string is specified on the screen, which requests to output the media information related to the character string.

A character string/media control mechanism 64 enters in a management information table 65 multimedia information (tool name, media name, etc.) corresponding to a character string specified as a key on the screen, and extracts the media information from the management information table 65 in response to the display of the character string on the display or through the application program 63. Then, the tool of the media information outputs the contents of the name of the media (for example, images, voice, characters, processes, procedures, etc.).

A media correspondence management mechanism 66 associates an extracted character string with corresponding media. A media data management mechanism 67 extracts media information from the management information table 65 using the character string as a key according to a retrieve instruction from the media correspondence management mechanism 66, or enters the media information in the management information table 65 using the character string as a key according to an entry instruction from the media correspondence management mechanism 66.

A media representing mechanism 68 displays on a display 69 the contents of a specified "media name" (for example, images, voice, characters, processes, procedures, etc.) based on the media information extracted from the management information table 65.

Although not shown in the attached drawings, a voice representing device such as a speaker for outputting voice is provided.

FIG. 13 shows an example of the contents of the management information table 65. The management information table 65 contains entries of media information with a character string ① as a key. The media information contains a tool name ②, media name ③, and others ④.

Character string 1 is a character string referred to as a key when media information is provided. A character string referred to as a key and corresponding media information can be associated one to one, one to n, and m to n (m and n are integers). Mark "a" in the character string ① shown in FIG. 13 indicates that the character string 910C001 is entered with two pieces of media information. That is, the character string referred to as a key corresponds 1-to-2 to media information. In this case, the contents of media information can contain the same tool name and different media names or different tool names and the same media name.

Tool name ② contains tool names for representing (outputting) media. Actually, the program name of a tool is entered. Examples of tool names are explained below.

Image displaying tool: Displays static images, etc. on the display 69. Image displaying tool A and image representing tool B represent reduced images and segmented images as shown in FIG. 17.

Voice outputting tool: Outputs PCM voice source data, a beep, etc.

Character outputting tool: Represents characters (text data).

Procedure tool: Performs procedures. For example, as described later by referring to FIG. 19B, procedures such as control of a VTR (start of VTR operation, seeking, setting VTR operation period, etc.)

Media name ③ is the entry name of media. Actually, the name of a file containing media is entered. Others ④ contains additional information corresponding to each media such as comment, history, etc.

As described above, media information (tool name, media name, etc.) is entered, as being associated with its corresponding character string, in the management information table 65 according to which media (for example, images, voice, video animation, etc.) can be displayed on the screen together with corresponding character strings. If entered media are altered or added, they only have to be altered or added in the management information table 65.

Next, described below is the process of entering media information in the management information table 65 as being associated with a character string as a key according to the sequence shown in the flowchart shown in FIG. 14 by referring to FIGS. 15A, 15B, 16A and 16B.

Figure 14:
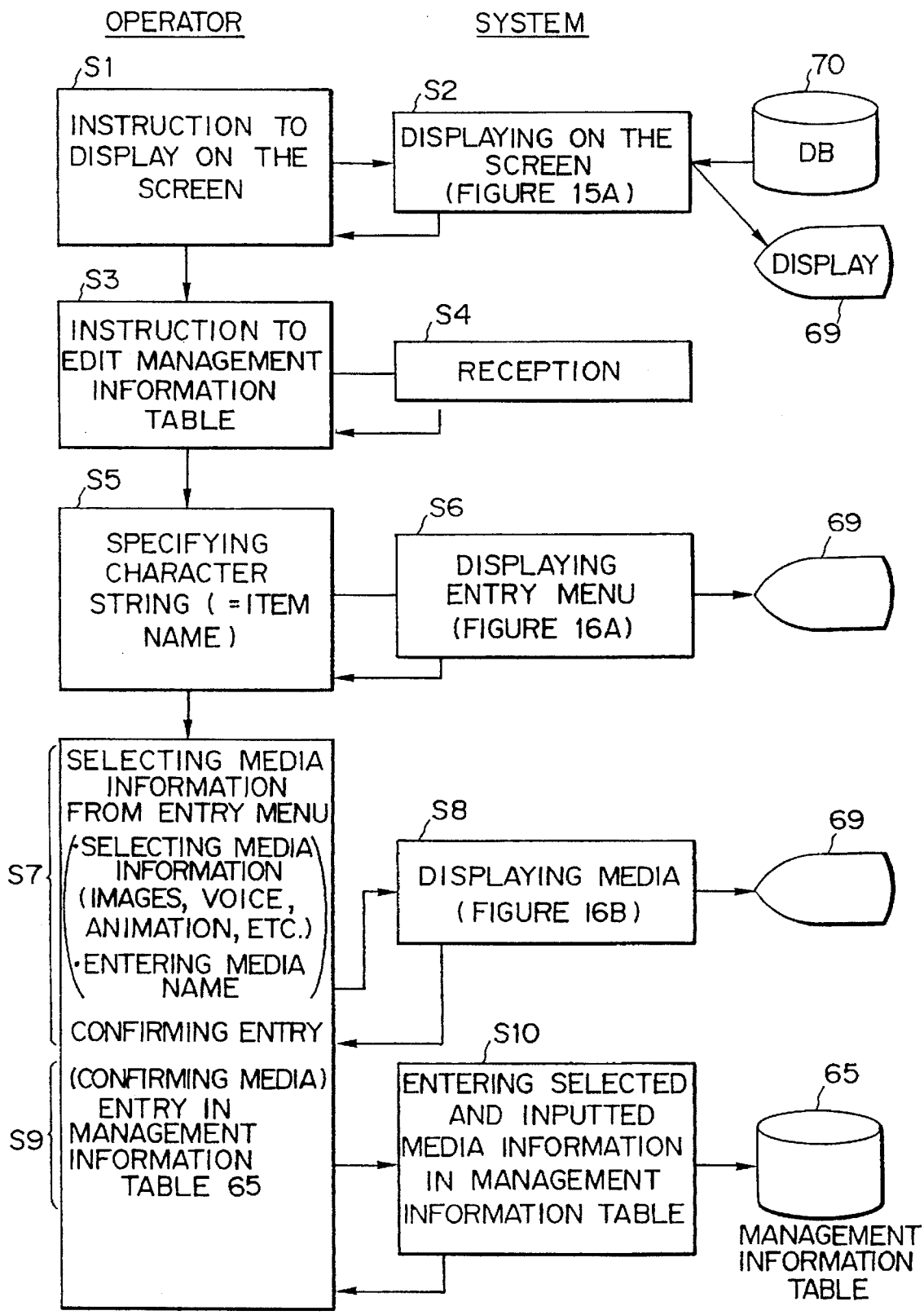
FIG. 14 is the flowchart indicating entries of media according to the second embodiment.

In FIG. 14, when an operator instructs to display data on the screen (step S1), the application program 63 of the system according to the second embodiment retrieves specified screen data from data base 70 and displays them on the display 69 (step S2). In this case, the screen shown in, for example, FIG. 15A is displayed.

Next, when the operator issues an edit instruction to edit the management information table 65 (step S3), the system accepts the instruction (step S4). Based on the contents shown on the display 69, the operator selects a character string, for example, 910A001 as a key using a mouse and instructs to display them as shown in FIG. 15B (step S5). When the operator specifies the character string, the system displays an entry menu (step S6). For example, an authoring menu is displayed as shown in FIG. 16A.

Next, the operator selects media information from the entry menu (authoring menu) displayed in step S6, and then enters it (step S7). The media information is selected from among:

Image: TIFF format

Voice: WAV format

Animation: MMM format

A media name of the media information is also entered.

Thus, when media information (type of media) is selected and its media name is entered, the system displays the selected media on the display 69 (step S8). For example, if an image is selected as a selected type of media, and the entered media name is "gear", then an image of the gear is displayed as shown in FIG. 16B. Viewing the contents of the display, the operator determines whether or not the displayed media is appropriate. If yes, the operator instructs the system to enter the media in the management information table 65 (step S9).

When an entry instruction is issued to enter the media in the management information table 65, the system generates, for example, the following media information with the character string set as a key.

Character string: 910A001

Tool name: Image displaying tool A

Media name: Gear

Others: Comment, history, etc.

Then, the system enters the data in the management information table 65 as shown in FIG. 13.

Thus, if the operator has the system display the screen shown in FIG. 15A and specifies a character string as a key as shown in FIG. 15B, then an authoring menu is displayed as an entry menu as shown in FIG. 16A. When an image is selected as the type of media and "gear" is entered as a media name, then the type of media "image" and the media name "gear" are entered in the management information table 65.

FIGS. 15A and 15B referred to in the explanation above show practical examples (1) of the second embodiment. Likewise, FIGS. 16A and 16B show practical examples (2). These figures shows the cases in which the present invention is applied to a parts order system. Therefore, entries are "parts order business" as a business type, "ordering and accepting persons" as users, "reception in factory" and "delivery center", etc. as a location.

FIG. 15A shows a host screen displaying a specified parts order screen retrieved from the data base 70 and displaying the contents on the display. The screen shows actual contents of a parts order. FIG. 15B shows a method (1) of displaying multimedia information and indicates that the operator has selected and specified the character string 910A001 as a key on the screen.

FIG. 16A shows a method (2) of displaying multimedia information. As shown in FIG. 15B, the character string 910A001 is selected and specified as a key in the screen, and the authoring menu, that is, the entry menu, displays the following data, and the operator has selected the "image" from among them:

Image: TIFF format

Voice: WAV format

Animation: MMM format

FIG. 16B shows a method (3) of displaying multimedia. In response to the operator's selecting the "image" as shown in FIG. 16A, the image of a gear (in this case) is shown as shown in FIG. 16B. To display the image, a painting tool is activated to draw a gear or read a photocopy of the gear through a scanner and enter it.

As described above, the character string 910A001 as a key is associated with media information. In this case, the entries are entered in the top column of the management information table 65 shown in FIG. 13. Thus, tool name, media name, and other items are entered as being associated with the character string, that is, a key on the screen, in the management information table 65.

FIG. 17 shows multimedia information according to the second embodiment. It shows an example that the same data can be displayed in different representations depending on tools. That is, the same media data can be displayed either as being compressed if image displaying tool A (for displaying an image in a compressed form) is selected or as being segmented if image displaying tool B (for displaying an image in a segmented form) is selected. The operator can optionally select one of the image displaying tool A and image displaying tool B and enter it in the column of a tool name in the management information table 65 shown in FIG. 13. Furthermore, a character string as a key on the screen can correspond 1 to 1, 1 to n, or m to n (m and n are integers) to media information (the detailed explanation is described later).

Figure 18:
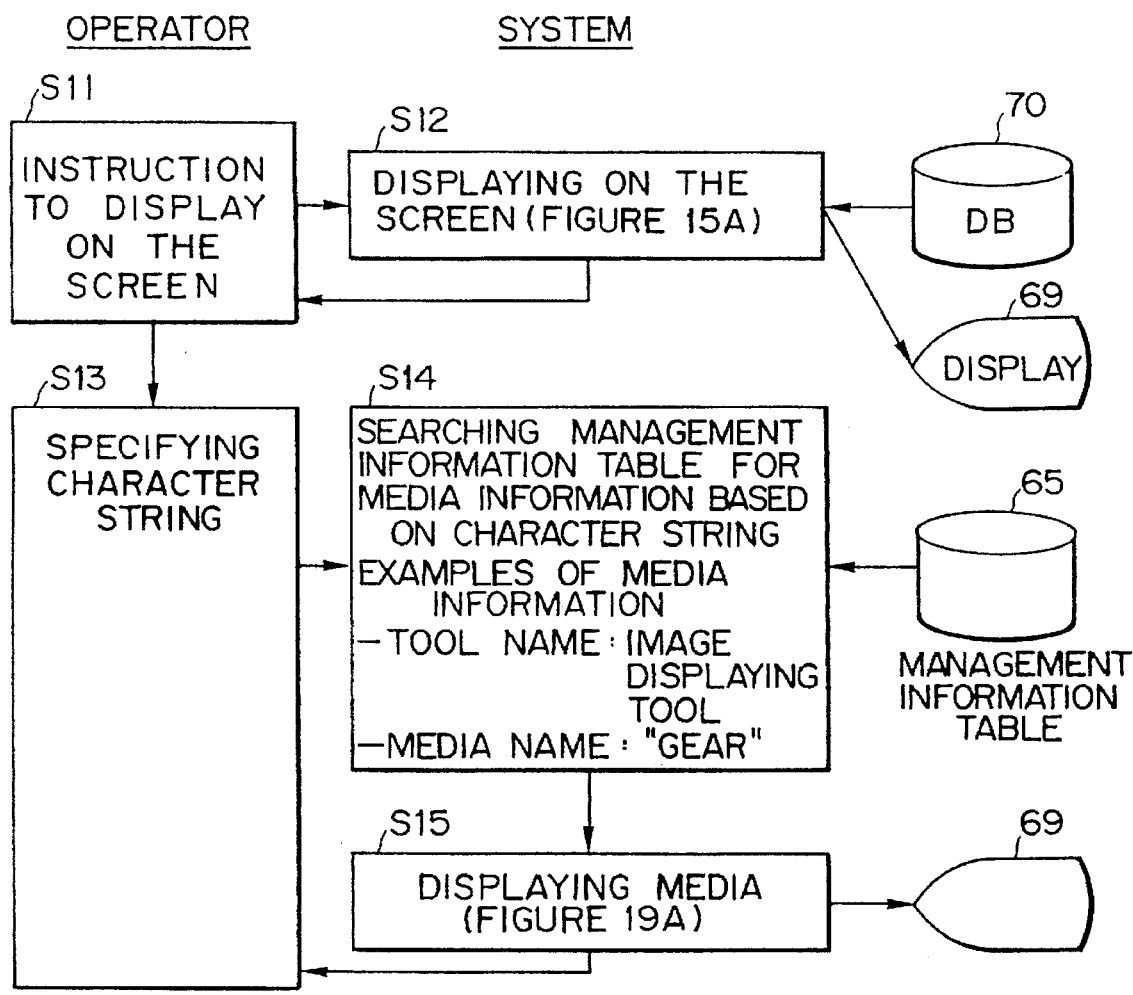
FIG. 18 is the flowchart of the representation of multimedia (1 to 1) according to the second embodiment.

First, the media information displaying operation in which a character string as a key on the screen corresponds 1 to 1 to media information is explained according to the order shown in the flowchart in FIG. 18.

In FIG. 18, if the operator issues a display instruction to the system (step S11), then the application program 63 of the present system retrieves specified screen data from the data base 70 and displays them on the display 69. For example, the screen shown in FIG. 15A is displayed (step S12).

Next, when the operator specifies the character string 910A001 as a key from the contents displayed on the display 69 (step S13), the system searches the management information table 65 based on the specified character string, and retrieves media information corresponding t0 the character string (step S14). In the present case, "910A001" is retrieved as a character string, "image displaying tool A" as a tool name, "gear" as a media name, and "comment, history, etc." as others. Thus, the media information is retrieved based on the character string as a key.

Figures 19A, 19B:
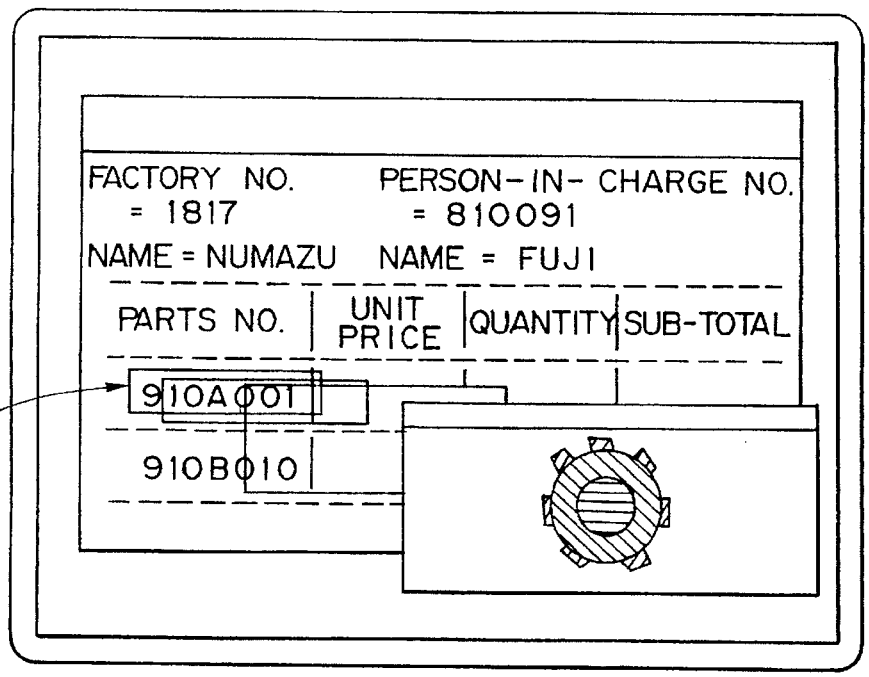
FIGS. 19A and 19B show examples of a displaying of multimedia information (1 to 1) according to the second embodiment.

Based on the media information retrieved in step S14, media are displayed on the screen. For example, in this example, image displaying tool A retrieves image data from the file containing the media name "gear", and displays the picture of a gear on the display 69 as shown in FIG. 19A. Otherwise, a voice outputting tool can vocally explain the screen "This is a handle gear for a sedan "A" of '91 model" as shown in FIG. 19B.

Thus, if a character string as a key on the screen corresponds 1 to 1 to media information in the management information table 65, then media information corresponding to the character string is retrieved from the management information table 65 when the operator specifies the character string as a key on the screen, and a tool having a tool name associated with the media information outputs the contents of the "media name". For example, an image displaying tool displays a picture of a gear, or a voice outputting tool vocally explains the contents of parts.

FIG. 19A shows an example of displaying multimedia (for dynamically displaying images). In the example, a clicking of a mouse at the character string 910A001 as a key on the screen retrieves corresponding media information ("image displaying tool A" as a tool name, "gear" as a media name, and "GEAR. TIFF" as an internal image) from the management information table 65 shown in FIG. 13. The retrieved image information tool A displays the picture of the gear specified with the media name "gear" at an optional position in the window (or at a specified position).

FIG. 19B shows an example of displaying multimedia (outputting a dynamic voice source). In the example, a clicking of a mouse at the character string 910A001 as a key on the screen retrieves corresponding media information ("voice outputting tool" as a tool name, "explanation of the screen" as a media name, and "GEAR. SND" as an internal image) from the management information table 65 shown in FIG. 13. The retrieved voice tool A vocally explains the voice data specified with the media name "explanation of the screen" for the contents shown in FIG. 19B.

Figure 20:
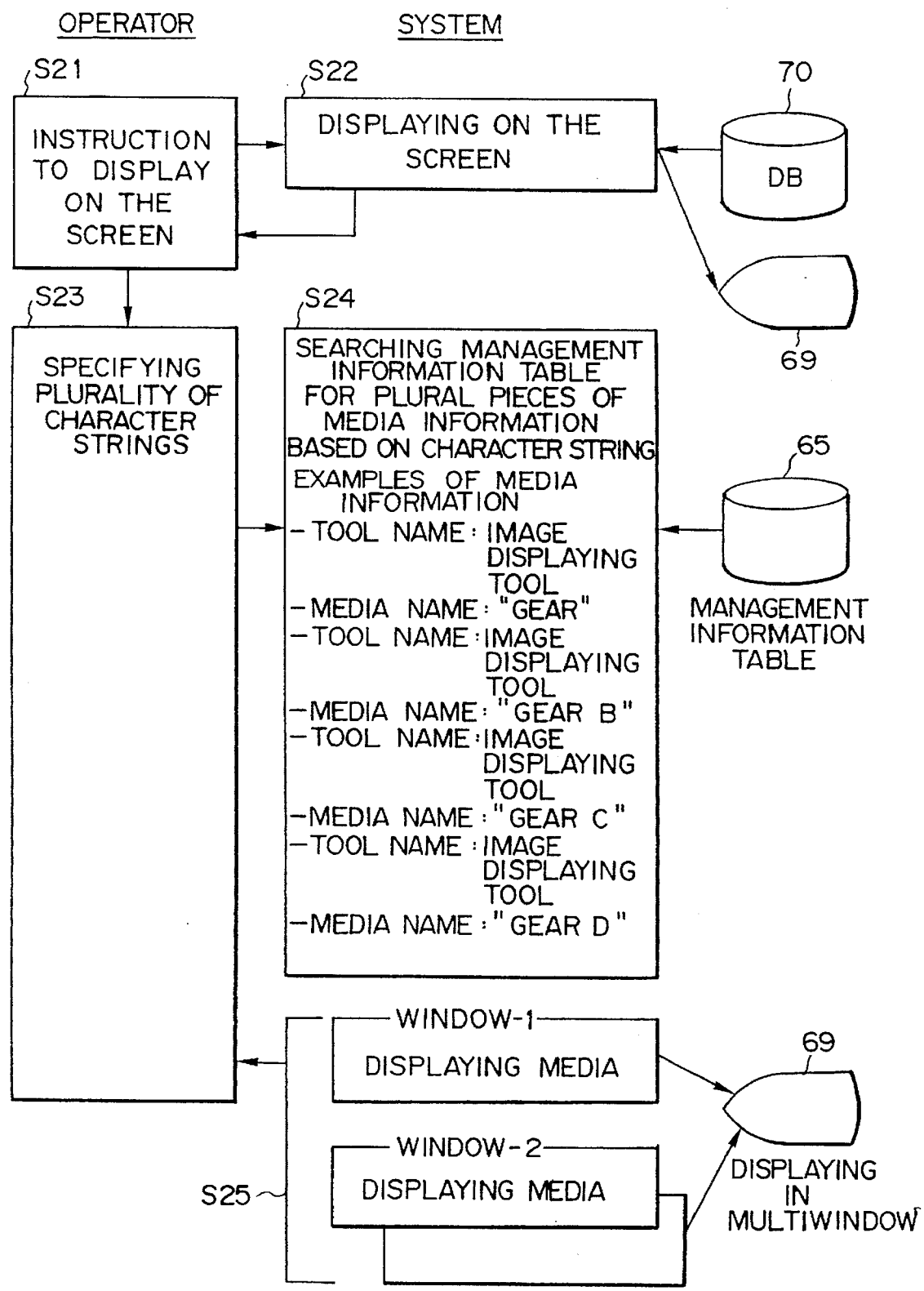
FIG. 20 is the flowchart of the representation of multimedia (m to n) according to the second embodiment.

Next, the media information representing operation in which a character string as a key on the screen corresponds m to n to media information is explained according to the order shown in the flowchart in FIG. 20.

In FIG. 20, if the operator issues a display instruction to the system (step S21), then the application program 63 of the present system retrieves specified screen data from the data base 70 and displays them on the display 69. For example, the screen shown in FIG. 15A is displayed (step S22).

Next, when the operator specifies the character strings 910A001 through 910D001 as a key (information on the character strings other than 910A001 cannot be displayed unless the screen is scrolled) from the contents displayed on the display 69 (step S23), the system searches the management information table 65 based on the specified character strings, and retrieves plural pieces of media information corresponding to the character string (step S24). For example, the following media information are retrieved.

Tool name: screen displaying tool

Media name: gear

Tool name: screen displaying tool

Media name: gear B

Tool name: screen displaying tool

Media name: gear C

Tool name: screen displaying tool

Media name: gear D

Based on the media information retrieved in step S24, media are displayed in each window on the display 69 (step S25).

Thus, if a character string as a key on the screen corresponds m to n to media information in the management information table 65, then plural pieces of media information corresponding to the character strings are retrieved from the management information table 65 when the operator specifies the character string as a key on the screen, and tools having a tool names associated with the plural pieces of media information output the contents of the "media names". For example, an image displaying tool displays a picture of a gear, or another image displaying tool displays a picture of another gear.

FIGS. 21A and 21B show the operation performed when a character string is entered in the management information table 65 as a key corresponding m to n to media information. FIG. 21A shows a method of displaying multimedia (for displaying multimedia). In this example, the character strings 910A001 and 910B001 are simultaneously selected. FIG. 21B shows an example of displaying multimedia (for dynamically displaying images).

FIG. 21B shows an example of retrieving corresponding media information (two pairs of tool names "image displaying tools" and media names "gears") from the management information table 65 in response to the simultaneous selection of the character strings 910A001 and 910B001 as keys as shown in FIG. 21A, and then displaying by the retrieved image displaying tools the pictures of the gears specified by the media names "gears" in windows 1 and 2 separately.

Figure 22:
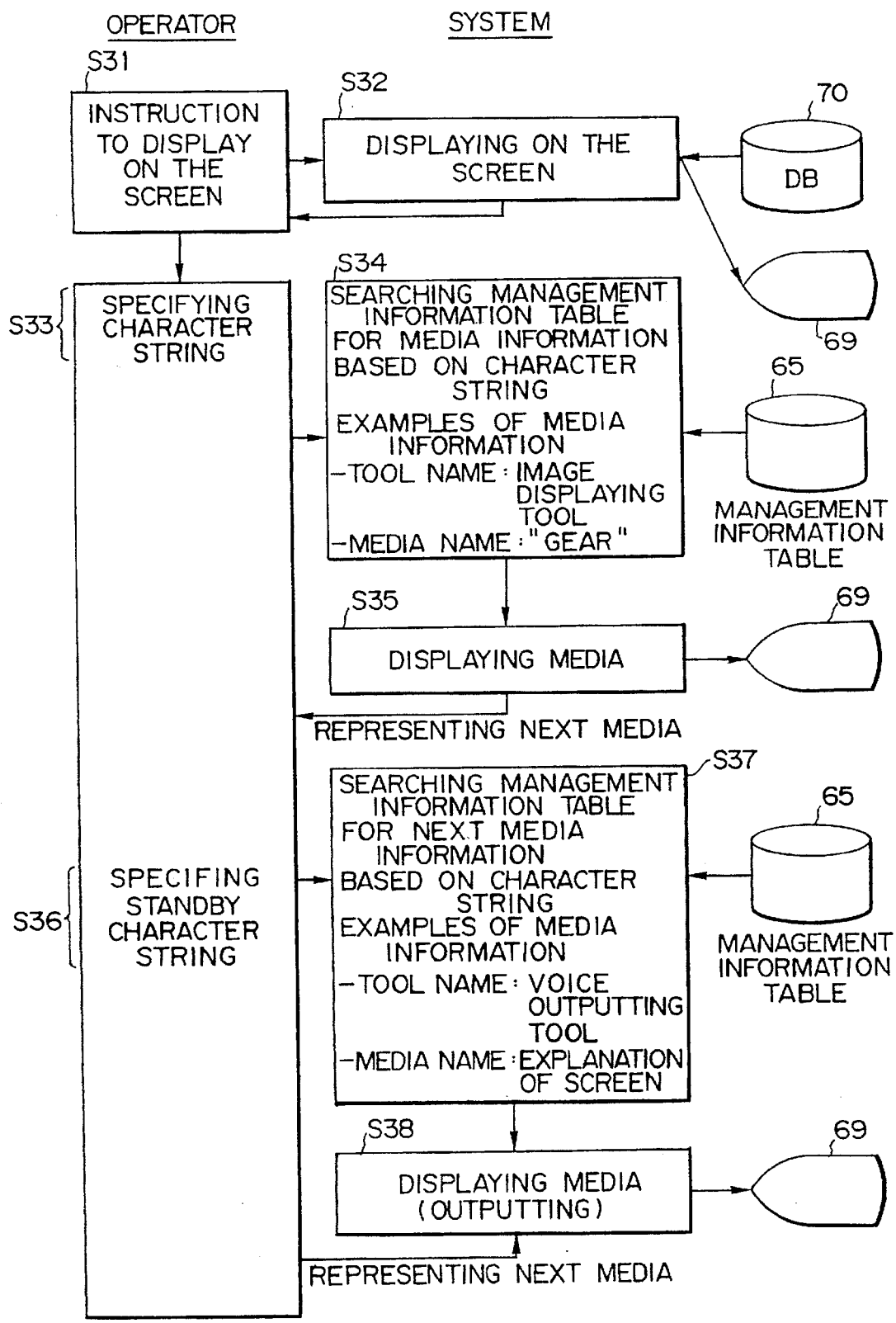
FIG. 22 is the flowchart of the representation of multimedia (1 to n) according to the second embodiment.

Next, an example of representing media when a character string as a key corresponds 1 to n to media information by referring to the flowchart shown in FIG. 22.

In FIG. 22, if the operator issues a display instruction to the system (step S31), then the application program 63 of the present system retrieves specified screen data from the data base 70 and displays them on the display 69. For example, the screen shown in FIG. 15A is displayed (step S32).

Next, when the operator specifies the character string 910A001 as a key from the contents displayed on the display 69 (step S33), the system searches the management information table 65 based on the specified character string, and retrieves media information corresponding to the character string (step S34). For example, the following media information is retrieved.

Tool name: screen displaying tool
Media name: gear

Additionally, in the present case, the following information is entered.

Tool name: voice outputting tool
Media name: screen explanation

However, since these are standby information, they are not displayed here.

Based on the media information retrieved in step S34, media are displayed on the screen (step S35). For example, in this example, image displaying tool retrieves image data from the file containing the media name "gear", and displays the picture of a gear in a window on the display 69.

Next, the operator depresses the "standby" key to specify the next prospect (step S36). Thus, based on the character string specified in step S33, the system searches the management information table 65 and retrieves the standby media information (step S37). The standby media information is listed as follows.

Tool name: voice outputting tool
Media name: explanation of screen

Then, based on the media information retrieved in step S37, the voice outputting tool displays media (step S38). In this example, the voice outputting tool vocally explains the picture of a gear.

Thus, if a character string as a key on the screen corresponds 1 to n to media information in the management information table 65, then media information corresponding to the character string is sequentially retrieved from the management information table 65 when the operator specifies the character string as a key on the screen. For example an image displaying tool displays a picture of a gear, and a voice outputting tool outputs voice for explaining the screen displaying the gear. Thus, tools specified with the media names in the media information sequentially output the contents of media names.

As described above, according to the second embodiment, media information is entered in a management information table as being associated with a character string as a key. Based on the entered information, the media corresponding to the selected character string can be outputted. Accordingly, images, characters, voice, animation, etc. can be displayed corresponding to a specified character string.

Furthermore, since a mechanism for representing (outputting) various media such as images, characters, voice, processes, procedures, etc. as being associated with a specified character string is provided independently of an existing character displaying system, media information can be easily displayed without altering a program of the existing system. Additionally, the type of media and the outputting format can be changed by only modifying the contents of entries in the management information table.

As in the first embodiment, the second embodiment monitors a change in information at a predetermined position on the screen. When any change is detected in the information, a character string to be displayed with media information is extracted according to predetermined contents, and media information (information on a representing format of media and actual media information) corresponding to the character string can be retrieved to display the media corresponding to the character string to be displayed with media information.

As described above, the present invention easily displays media information such as images, voice, animation, etc. as being added to character information without altering an existing displaying system for mainly displaying characters, and easily changes the type of media information and a displaying method without affecting the existing displaying system.

What is claimed is:

1. A multimedia information add-on system comprising:
    screen monitoring means for detecting that an object character string is displayed on a display device by a character displaying system;
    defined information means for storing a plurality of character strings and plural pieces of multimedia associated with each of the plurality of character strings; and
    multimedia information outputting means for retrieving from said defined information means multimedia information which corresponds to the object character string detected by said screen monitoring means, and for displaying the retrieved multimedia information at a predetermined position on the display device, wherein said multimedia information add-on system is different from the character displaying system, and is added to the character displaying system.

2. The multimedia information add-on system according to claim 1, wherein said screen monitoring means detects that the specified information is displayed at a specified position on the display device, and wherein said multimedia information outputting means comprises:
    media display information control means for receiving the specified information from said screen monitoring means and reading the multimedia information which corresponds to the specified information from said defined information means; and
    media display control means for outputting for display to said display device the multimedia information read from said media display information control means.

3. The multimedia information add-on system according to claim 1, wherein the plurality of multimedia information stored in said defined information means includes layout information for use in a designation of a displaying format of multimedia information to be displayed, and actual multimedia information to be displayed.

4. The multimedia information add-on system according to claim 3, wherein
    said media display control means displays actual information in a layout specified by the layout information.

5. The multimedia information add-on system according to claim 1, wherein
said screen monitoring means detects a character code outputted by the character displaying system.

6. The multimedia information add-on system according to claim 1, wherein said screen monitoring means monitors screen information for use in a determination of a necessity to refresh the screen, positions for character strings to be displayed with the multimedia information is extracted, and for monitoring the character strings.

7. The multimedia information add-on system according to claim 1, wherein
said character displaying system comprises a computer system; and
said screen monitoring means comprises a software driver for displaying and outputting data from said computer system to the display device.

8. The multimedia information add-on system according to claim 1, wherein an execution result of a first task performed by said character displaying system is detected by a second task performed by said character displaying system to output the multimedia information which corresponds to the specified information.

9. The multimedia information add-on system according to claim 8, wherein said character displaying system retrieves a data base by executing the first task, said second task detects that a result of the retrieval is displayed in a first window, and wherein the multimedia information which corresponds to the specified information is outputted to a second window.

10. A multimedia information add-on system for displaying multimedia information corresponding to a character string, comprising:
screen information generating means for generating, as defined screen information based on operator-inputted information at a setting of an environment, screen information for use in determining a necessity to refresh a screen of a display device, said screen being displayed by the character displaying system, and for generating information on a position at which the character string to be displayed with the multimedia information is extracted;
layout information generating means for determining, as defined layout information based on operator-inputted information at the setting of the environment, a position of a frame in which the multimedia information is displayed, a size of a frame, and a display format of the multimedia information;
multimedia information generating means for generating, as defined multimedia information based on operator-inputted information at the setting of the environment and based on the information on the position at which the character string to be displayed with the multimedia information is extracted, layout information and actual information on the multimedia information to be displayed;
screen monitoring means for monitoring the screen and extracting the character string to be displayed with the multimedia information according to preliminarily defined contents when an information change in at least one of the screen information and the information on the position at which the character string to be displayed with multimedia information is extracted is detected;
multimedia display information control means for retrieving, from the defined layout information and the defined multimedia information, information on the layout and multimedia information corresponding to the character string to be displayed with the multimedia information extracted from said screen monitoring means; and
multimedia display control means for analyzing information obtained from said multimedia display information control means and displaying the multimedia information on a display screen, wherein said multimedia information add-on system is configured to be attached to said character displaying system, without modifying said character displaying system.

11. The multimedia information add-on system according to claim 10, further comprising
means for defining the screen information for use in the determination of the necessity to refresh the screen of the display device and for defining the information on a position at which the character string to be displayed with the multimedia information is extracted, said means for defining setting a coordinate in a specified range of an area on a display screen, wherein a field specified with the coordinate is designated as a screen field position, said screen field position identifying the position at which the character string to be displayed with the multimedia information is extracted.

12. The multimedia information add-on system according to claim 10, wherein means for determining a necessity to refresh the screen monitors the character string in a specified range of an area indicating the position of the screen field on the display screen, and determines the necessity to refresh of the screen according to a change in the character string.

13. The multimedia information add-on system according to claim 10, wherein the character string to be displayed with the multimedia information is extracted by extracting a selected character string within a predetermined range of coordinates indicating a position at which the selected character string is extracted on the display screen.

14. The multimedia information add-on system according to claim 10, further comprising means for preliminarily setting, as defined layout information, a position and size of the frame and a display format of the multimedia information to be displayed in the frame,
wherein said means for preliminarily setting sets the position and size of the frame for each display format of a plurality of display formats, and sets the display format of the multimedia information for each type of information to be displayed in the frame.

15. The multimedia information add-on system according to claim 10, further comprising means for preliminarily setting, as the defined multimedia information the layout information and the actual information on the multimedia information to be displayed sets a layout to be used for each character string to be displayed with the multimedia information, and sets a name of a file in which actual data of each type of multimedia information to be displayed in the frame of the layout are stored.

16. The multimedia information add-on system according to claim 10, wherein said media display information control means receives character-string-to-be-displayed-with-media information from said screen monitoring means, searches the defined layout to be used corresponding to the character string information, retrieves the frame information depending on the display format, also retrieves the actual multimedia information for each type of multimedia information to be displayed in the frame, further retrieves the display position and size of the frame, and the information on the display format of the multimedia information displayed in the frame, and outputs the information to said multimedia display control means.

17. The multimedia information add-on system according to claim 10, wherein a window display system is operated by a second task, different from a first task operated by said character displaying system.

18. The multimedia information add-on system according to claim 17, wherein said character displaying system monitors a first window, of said window display system and outputs the multimedia information corresponding to the predetermined information on a second window when the predetermined information is displayed on the first window.

19. A multimedia information add-on system for displaying multimedia information corresponding to predetermined information, said system comprising:

screen monitoring means for detecting that specified information is displayed by a character displaying system at a specified position on a screen of a display device;

defined information means for storing preliminarily defined screen monitoring information for use in a determination as to whether or not the specified information has been displayed at the specified position on the screen of the display device, and for storing preliminarily defined multimedia information to be added to the specified information; and multimedia information outputting means for retrieving from said defined information means multimedia information corresponding to the specified information, wherein said specified information is detected to be displayed at the specified position on the screen of the display device; and said multimedia information corresponding to the specified information is retrieved for display from said defined information means.

20. A multimedia information add-on system, said system comprising:

a management information table containing multimedia information associated with each character string to be displayed on a screen by a character display system; and a tool having a tool name and containing information regarding a media type, for detecting the character string displayed by the character display system, and retrieving corresponding multimedia information from said management information table using the detected character string as a key, without modifying the designated character string.

21. The multimedia information add-on system according to claim 20, wherein selecting a character string as a key on the screen specifies multimedia information to be displayed;

in response to said specification of media information the tool name and the information regarding the media type corresponding to the selected multimedia information associated with the selected character string as a key are specified in said management information table, and the media specified as being associated with the media name are stored.

22. The multimedia information add-on system according to claim 20, wherein said plurality of tools for outputting the multimedia information include image displaying tools, voice outputting tools, character outputting tools, and procedure tools.

23. The multimedia information add-on system according to claim 20, wherein the character string as a key is specified in said management information table, as corresponding to a tool name and media type.

* * * * *